United States Patent
Zalta

(10) Patent No.: US 7,742,957 B2
(45) Date of Patent: Jun. 22, 2010

(54) SYSTEM AND METHOD FOR DEFINING BILLABLE LABOR BY SETTING PROFIT

(76) Inventor: Danny P. Zalta, 3939 E. 60th St., Tulsa, OK (US) 74135

(*) Notice: Subject to any disclaimer, the term of this patent is extended or adjusted under 35 U.S.C. 154(b) by 0 days.

(21) Appl. No.: 11/740,637

(22) Filed: Apr. 26, 2007

(65) Prior Publication Data

US 2007/0276742 A1 Nov. 29, 2007

Related U.S. Application Data

(63) Continuation-in-part of application No. 11/440,625, filed on May 24, 2006, now abandoned.

(51) Int. Cl.
| | |
|---|---|
| G07B 17/00 | (2006.01) |
| G07F 19/00 | (2006.01) |
| G06F 9/44 | (2006.01) |
| G06F 17/50 | (2006.01) |
| G06F 17/22 | (2006.01) |
| G06F 15/02 | (2006.01) |
| G06Q 20/00 | (2006.01) |
| G06Q 10/00 | (2006.01) |
| G06Q 40/00 | (2006.01) |
| G06G 1/14 | (2006.01) |
| G07F 7/10 | (2006.01) |
| H04M 15/00 | (2006.01) |

(52) U.S. Cl. ............... 705/30; 705/7; 705/20; 705/22; 705/28; 705/31; 705/32; 705/33; 705/34; 705/35

(58) Field of Classification Search ............ 705/22, 705/26, 28, 7
See application file for complete search history.

(56) References Cited

U.S. PATENT DOCUMENTS 5,249,120 A * 9/1993 Foley ............................ 705/1

(Continued)

OTHER PUBLICATIONS

Institute of Management accountants, AZ Valley of the Sun Chapter, [retrieved on Jan. 17, 2008], retrieved from the internet <http://www.imavalleyofthesun.org/Imports/Dan%20Zalta%20bio.doc>.*

(Continued)

*Primary Examiner*—Matthew S Gart
*Assistant Examiner*—Ig T An
(74) *Attorney, Agent, or Firm*—Ostrolenk, Faber LLP

(57) ABSTRACT

In accordance with a preferred embodiment, the present invention comprises a system and method for ensuring a desired profit percentage in a business that provides a service for fees. Businesses will know what prices to charge for any profit level desired. Three profit areas can be used to arrive at a service fee; labor, equipment, and inventory. Input of a desired profit will automatically recalculate how billable labor is charged out in each billable labor dollar of revenue. Preferably, electronic sales information is received that represents a sum of fees received for providing the service. Further, electronic inventory cost information is received that represents a cost of goods sold during the course of providing the service. Moreover, electronic billable labor cost information is received that represents a cost of billable labor, and electronic non-billable labor cost information representing cost of non-billable labor. Furthermore and in a preferred embodiment, electronic overhead cost information is preferably received that represents a cost of overhead. An electronic profit percentage value is preferably received that represents a percentage of fees charged for the service to be allocated for profit. Also, a portion of the labor fee charged is calculated to represent billable labor, non billable labor, and overhead.

46 Claims, 11 Drawing Sheets

U.S. PATENT DOCUMENTS

| | | | | |
|---|---|---|---|---|
| 5,287,270 | A | * | 2/1994 | Hardy et al. .................. 705/34 |
| 5,633,919 | A | * | 5/1997 | Hogan et al. ........... 379/115.01 |
| 5,732,401 | A | * | 3/1998 | Conway ...................... 705/29 |
| 5,819,092 | A | * | 10/1998 | Ferguson et al. ............ 717/113 |
| 5,991,742 | A | * | 11/1999 | Tran ............................ 705/32 |
| 6,092,050 | A | * | 7/2000 | Lungren et al. ........... 705/36 R |
| 6,216,108 | B1 | * | 4/2001 | LeVander ...................... 705/7 |
| 6,622,128 | B1 | * | 9/2003 | Bedell et al. .................. 705/30 |
| 7,149,700 | B1 | * | 12/2006 | Munoz et al. .................. 705/8 |
| 7,162,428 | B1 | * | 1/2007 | Rosenthal et al. ............ 705/1.1 |
| 7,222,293 | B1 | * | 5/2007 | Zapiec et al. ............... 715/205 |
| 7,346,588 | B2 | * | 3/2008 | Shimizu et al. ............. 705/400 |
| 7,389,276 | B1 | * | 6/2008 | Barnard et al. ............. 705/400 |
| 2001/0056413 | A1 | * | 12/2001 | Suzuki et al. ............... 705/418 |
| 2002/0082862 | A1 | * | 6/2002 | Kelley et al. ................... 705/2 |
| 2003/0225989 | A1 | * | 12/2003 | Licalsi ....................... 711/167 |
| 2005/0187839 | A1 | * | 8/2005 | Butera et al. .................. 705/32 |
| 2006/0059032 | A1 | * | 3/2006 | Wong et al. ................... 705/10 |
| 2006/0259309 | A1 | * | 11/2006 | Pigott ............................ 705/1 |

OTHER PUBLICATIONS

Fee Technology, About Us Section, [retrieved on Mar. 10, 2009]. Retrieved from the internet <http://www.feetech.net/Resources/tulsareprinta.pdf>.*

Kirby Lee Davis, Mar. 23, 2007, The Journal Record, vol. 112, No. 101 Two Sections, retrieved from the internet <http://fee-tech.com/feetech-aboutus.html>.*

FairFees, Slide Show Section, [retrieved on Mar. 10, 2009]. Retrieved from the internet <http://www.fairfees.com/slideshow.asp>.*

Michael H. Rie er DVM, Diplomat ABVP-Management for Results, vol. 1, Copyright 1992, ADVAN,!!?& Communications, Chapter 10—Fees (41 pages).*

Michael H. Rie er DVM, Diplomat ABVP-Management for Results, vol. 1, Copyright 1992, ADVAN,!!?& Communications, Chapter 10—Fees (41 pages.*

International Search Report and Written Opinion mailed Dec. 18, 2007 in corresponding International Application No. PCT/US2007/12276.

Michael H. Riegger, DVM, Diplomat ABVP-Management for Results, vol. 1, Copyright 1992, ADVANSTAR Communications, Chapter 10—Fees (41 pages).

* cited by examiner

BEAUTY SALON BUSINESS

SYSTEM AND METHOD FOR DEFINING BILLABLE LABOR BY SETTING PROFIT

CROSS-REFERENCE TO RELATED APPLICATIONS

This application is a continuation-in-part of U.S. patent application Ser. No. 11/440,625, filed on May 24, 2006, and entitled SYSTEM AND METHOD FOR CALCULATING FEES ASSOCIATED WITH SERVICES, and is incorporated in its entirety by reference as if set forth herein.

BACKGROUND OF THE INVENTION

1. Field of the Invention

The present invention relates, generally, to calculating fees for services, and, more particularly, to a system and method for determining fees for services based on a desired profit percentage associated with a service industry.

2. Description of the Related Art

The ability to determine rates for professional services has been a significant impediment to those desiring to maintain a profitable business while simultaneously providing quality services that are affordable. Multitudes of professional services are provided each year to consumers, and many competing businesses in a respective service industry charge rates that are markedly different. Moreover, consumers who require professional services cannot accurately assess whether the fees they are charged are fair and/or accurately reflect the quality of services rendered. One unfortunate result is that consumers do not call into question the fees they are charged for a professional service or do not question the quality of the service that is rendered without a clear indication of a problem with the quality of service, the fees associated therewith or both. Another unfortunate result is that consumers unfairly call into question the fees they are charged or the quality of a service they receive.

Many businesses that provide professional services require employment staff, equipment and inventory supplies in the course of their business. The costs to a business that are associated with, for example, staff, equipment and supplies directly affect the profitability of a business providing professional services. Costs associated with employment staff can vary significantly depending upon the type and level of skill of the employee. For example, an office assistant is paid a lower salary (or hourly rate) than, for example, a skilled technician. Thus, costs associated with a providing a service depend, at least in part, upon the level of skill of the person either providing the service or contributing to the performance of the service.

Often in the prior art, a service provider may know that many costs are incurred during the course of providing services, however costs are not adequately factored into calculations to determine fees for respective services. The unfortunate result is that fees charged for providing services do not account accurately for all of the costs associated therewith and, accordingly, the fees are set too high or too low, artificially. In case the fees are set too low, consumers will likely be satisfied, but the business cannot realize its financial potential or may lose money. In case the fees are set too high, consumers may be dissatisfied.

Often, fees for services may not be calculated accurately because costs considered by the service provider for equipment represent only the purchase price of the equipment. Equipment, typically, has an estimated life span (e.g., a period of time in which equipment functions properly) and most equipment eventually requires replacement. Accordingly, equipment inherently has a replacement cost per use factor that represents a relationship between the cost associated with using equipment and the cost associated with replacing the equipment. For example, a centrifuge that costs $500 to replace, has an expected life span of five years, and is used two thousand times a year costs has a lower per use cost than one that is used only fifty times a year. One service provider using a centrifuge two thousand times per year should charge, for example, 5¢ per use in order to factor the cost associated with replacement, while a second service provider using a centrifuge only fifty times a year should charge, for example, $2.00 per use in order to factor the replacement cost.

Therefore and in view of the foregoing, fees for services that require use of equipment should be calculated to make an accurate return on the equipment, and to represent the costs associated with operating and replacing the equipment. Today, in most service oriented businesses, these calculations are not being made.

In addition to equipment, costs associated with employees and staff are also, typically, not factored adequately into a calculation of fees for services in the prior art. For example, variables such as wages paid, benefits (e.g., health insurance costs, license costs, dues, profit sharing, or the like), taxes paid by an employer and paid time off (e.g., holidays, vacation and sick leave) are not adequately assessed to calculate fees associated with providing professional services. A calculation should be made for each paid person that represents the sum of the person's gross wages, benefits and employer taxes paid. That sum should be divided by the number of billable work weeks in order to calculate a value referred to herein, generally, as a cost per billable minute value.

Further, labor associated with activities that are collateral to providing a service should be factored into the calculation of fees associated with professional services. For example, labor associated with setting up equipment, clean-up, etc are not assigned.

In certain instances, employees may spend time in non-productive areas or being non-productive. For example, a manager divides his time between management duties and actual production. In this case, the present invention supports identifying the percentage of time that managerial duties are performed, and that percentage is preferably applied to the manager's salary, and that portion of the manager's salary is input into the present invention and defined as non-billable time. The remaining percentage of salary is input into the billable employee portion of the income statement.

The same percentage may be applied to hours. For example, a manager is paid $40,000, half of the time is spent in management, half of the time is spent as production time, with actual productive time of 18 hours. In this context, $20,000 should be applied to non-billable time and $20,000 to billable time. The week work hours would be defined as ½ of 40 or 20 hours and billable hours would be the productive time spent within those work hours 18 out of 20 hours, and the production percent is 18/20 or 90%. Although costs associated with equipment and labor represent a significant portion of a service provider's expenses, it is recognized by the inventor that additional overhead expenses are incurred, such as costs related to leases, mortgages, utilities, advertisements and other operational expenses. It is estimated that labor/benefits/taxes represent approximately 55% of a service provider's accounting expenses. Operating overhead costs account for 22% of a service provider's accounting expenses. Inventory costs represent approximately 20% of a service provider's accounting expenses. Typically, businesses are guessing at the fees and do not know how to cover above costs and only realize a small profit, for example 3%. They do not know how to cost out for their leases, their mortgages, their utilities and/or their advertisement expenses. For example, 3% is an unfortunate result of low profit, which equates to 100% (i.e., 55%+22%+20%+3%) of a fee for service charged by a service provider. In the prior art, service providers were unable to account accurately for labor, equipment, inventory and supplies, and were therefore unable to expense such costs to calculate fees.

SUMMARY OF THE INVENTION

The present invention provides an innovative and powerful system and method for establishing profitable pricing for a service business where the owner will know the exact profit in every fee charged. The present invention provides a business with the ability to project service fees based on any desired profit level with changes in production, overhead, and employee costs. In a preferred embodiment, profit is used to determine how to charge out billable labor, including, for example, employees. A convenient and intuitive user interface is provided that automatically calculates fees for the full range of a business's services such that profit is provided in each price that is charged to a customer. Preferably, a desired profit percentage of a business's sales submitted by a user, and fees charged for billable labor associated with a service are automatically calculated to achieve the desired profit. In the invention, prices calculated and charged to a customer are fair to the customer, fair to the employees, and fair to the owner or proprietor, and that the fees, when charged to a customer, will result in a predefined percentage of profit.

In accordance with a preferred embodiment, the present invention comprises a system and method for ensuring a desired profit percentage in a business that provides a service for fees. Preferably, electronic sales information is received that represents a sum of fees received for providing the service. Further, electronic inventory cost information is received that represents a cost of goods sold during the course of providing the service. Moreover, electronic billable labor cost information is received that represents a cost of billable labor, and electronic non-billable labor cost information representing cost of non-billable labor.

Furthermore and in a preferred embodiment, electronic overhead cost information is preferably received that represents a cost of overhead. An electronic desired profit percentage value is preferably received that represents a percentage of fees charged for the service to be allocated for profit. A gross margin percent value is calculated that represents a difference of the sum of fees and the cost of inventory. The desired profit will recalculate the billable employee percent in every labor dollar billed, and a fee for the service is calculated, wherein a profit value realized by the fee for the service is the percentage represented by the electronic desired profit percentage value. Furthermore, a portion of the fee is calculated to represent attributed to billable labor.

In a preferred embodiment, each piece of equipment, each item of inventory, and all appropriate personnel are characterized as individual profit centers that incur respective costs to an employer, and the respective costs are fairly allocated to customers based upon each customer's particular usage thereof. In a preferred embodiment, fees charged to customers for billable employees are calculated to cover billable labor costs to employers, as well as to cover a percentage of costs of non-billable labor, overhead, and profit. A user preferably enters a parameter representing a desired profit percentage, and the present invention calculates appropriate increases in billable labor, thereby creating individual employee profit center. Moreover, equipment is preferably charged as a function of use and estimated life-span, and a return on investment is applied, turning equipment into profit center and distinct from labor. Inventory is preferably costed out and a mark-up is applied to turn inventory into a profit center, and distinct from labor and equipment. The present invention preferably takes the guess-work out of pricing and creates confidence in achieving and sustaining the bottom line.

Other features and advantages of the present invention will become apparent from the following description of the invention that refers to the accompanying drawings.

BRIEF DESCRIPTION OF THE DRAWINGS

For the purpose of illustrating the invention, there is shown in the drawings a form of the invention, which is presently preferred, it being understood, however, that the invention is not limited to the precise arrangements and instrumentalities shown. The features and advantages of the present invention will become apparent from the following description of the invention that refers to the accompanying drawings, in which:

Figure 1A:
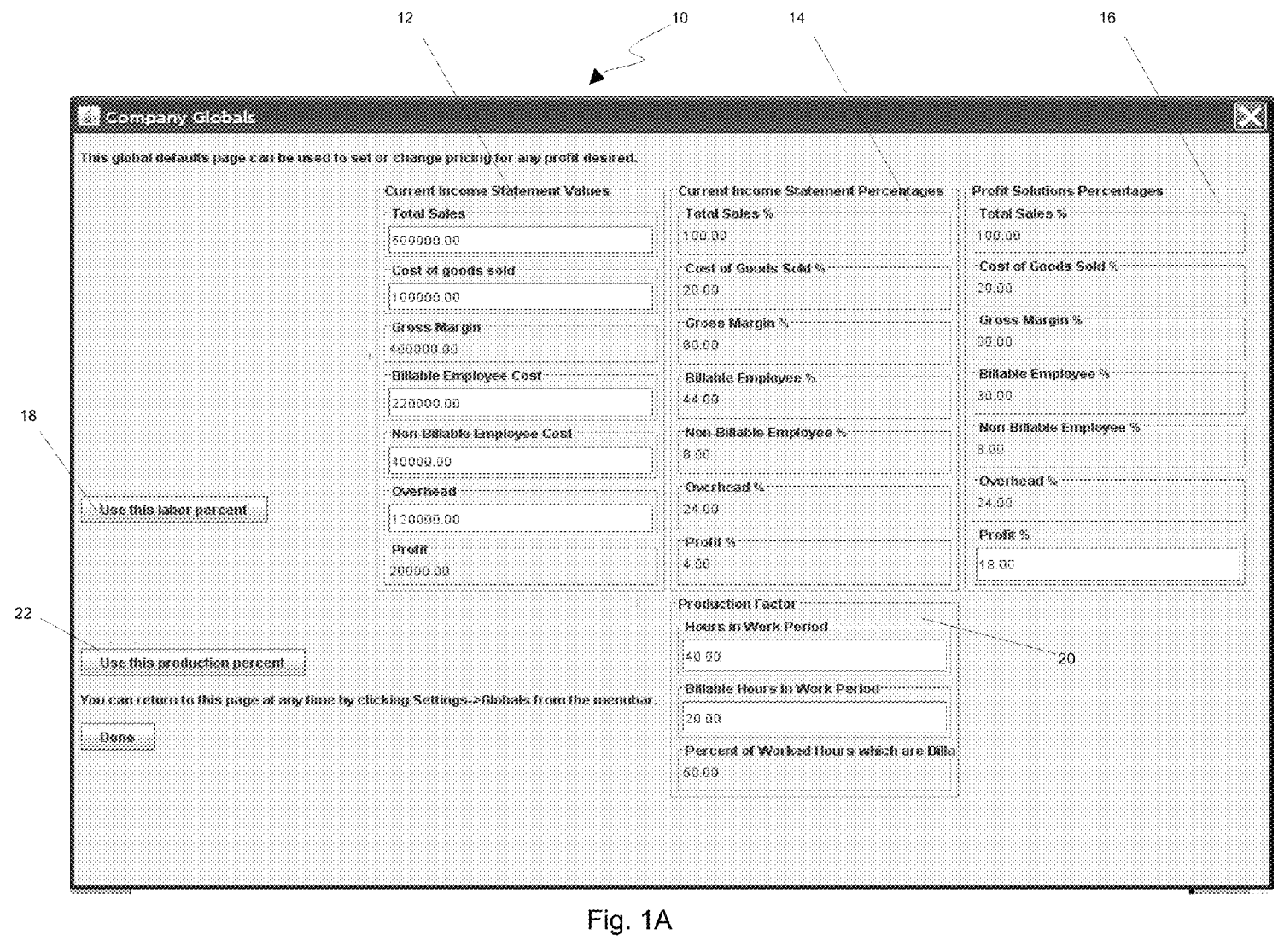

FIG. 1A shows an example display screen illustrating company values, including income statement values, percentages and profits in accordance with a preferred embodiment of the present invention;

FIG. 10 shows an example display screen illustrating company values, including income statement values, percentages and profits for multiple practices, in accordance with a preferred embodiment of the present invention.

DETAILED DESCRIPTION OF EMBODIMENTS OF THE INVENTION

Figure 1B:
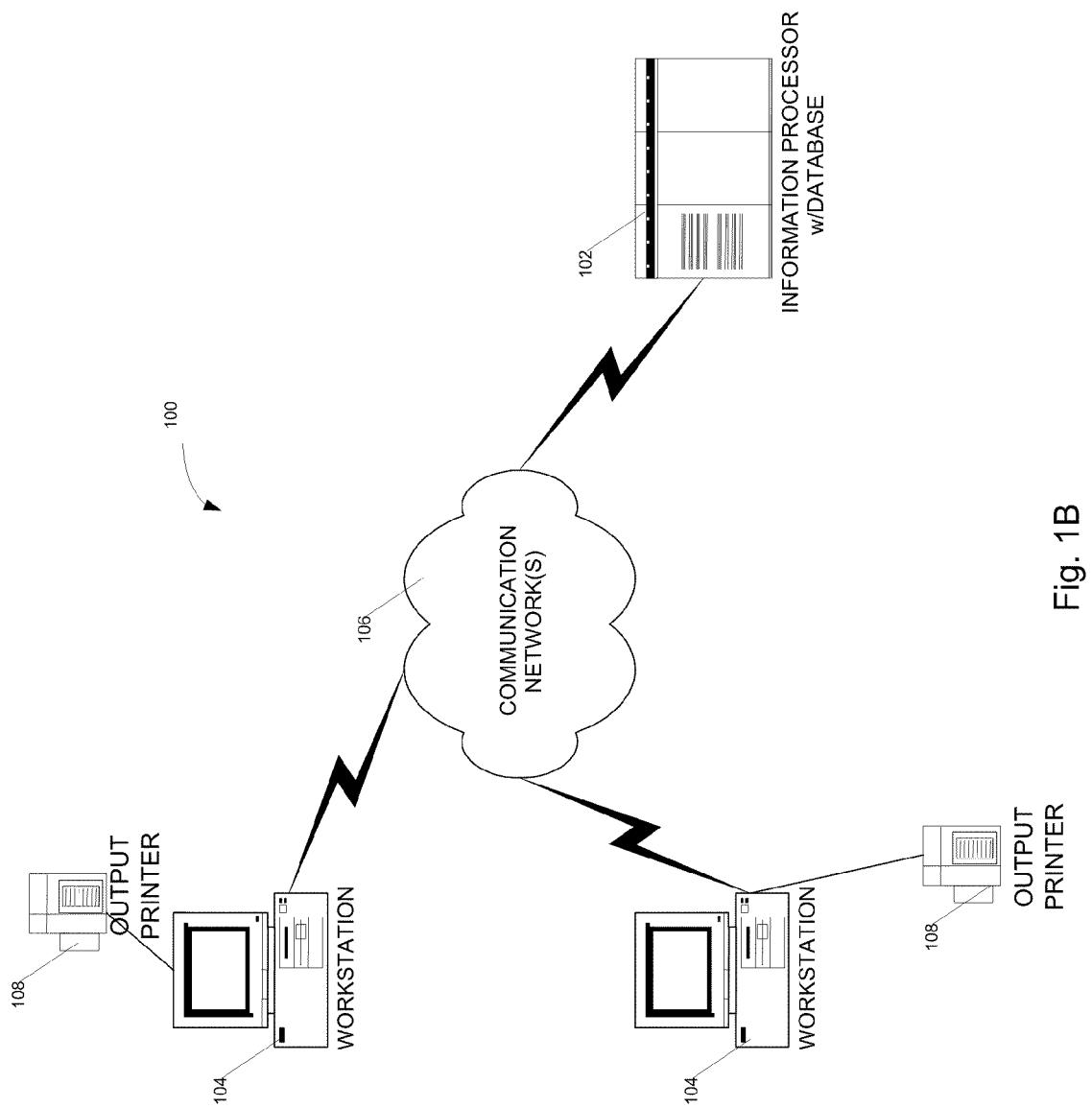
FIG. 1B illustrates an example hardware arrangement according to a preferred embodiment of the present invention.

The present invention provides an innovative and powerful system and method for establishing profitable pricing for a service business in which the owner will know the exact profit in every fee charged. The present invention provides a business with the ability to project service fees based on any desired profit level with changes in production, overhead, and employee costs. A convenient and intuitive user interface is provided that automatically calculates fees for the full range of a business's services such that profit is provided in each price that is charged to a customer. The invention ensures that fees that are calculated and charged to a customer are fair to the customer, fair to the employees, and fair to the owner or proprietor, and that the fees, when charged to a customer, will result in a predefined percentage of profit.

Although the term, "employee" is used with reference to the figures and examples, the descriptions herein are not meant to limit the invention to employees, per se. Any party or person who contributes any labor in any respect for a service provider can be identified as an employee by the present invention. Thus the term, employee, is meant to represent parties who contribute labor for a service provider, and not restricted to parties who are formally employed by a service provider.

In a preferred embodiment, each piece of equipment, each item of inventory, and all appropriate personnel are characterized as individual profit centers that incur respective costs to an employer, and the respective costs are fairly allocated to customers based upon each customer's particular usage thereof. In a preferred embodiment, fees charged to customers for billable employees are calculated to cover the billable labor costs to employers, as well as to cover a percentage of costs of non-billable labor, overhead, and profit. A user preferably enters a parameter representing a desired profit percentage, and the present invention calculates appropriate changes in billable labor, thereby creating individual employee profit center. Equipment is preferably charged as a function of use and estimated life-span, and a return on investment is applied, turning equipment into profit center and distinct from labor. Moreover, equipment supplies and maintenance cost are charged to the client based on usage resulting in reimbursement of overhead, and a mark-up can be applied, directly lowering overhead costs and creating profit. Inventory is preferably costed out and a mark-up is applied to turn inventory into a profit center, and distinct from labor and equipment. The present invention preferably takes the guesswork out of pricing and creates confidence in achieving and sustaining the bottom line.

In a preferred embodiment, the present invention provides a user interface that receives information from a user to display cost area analysis. In on context, users preferably enter a total annual sales figure, and, when applicable, subtract the cost of goods sold (i.e., inventory purchased). The resulting difference is referred to herein generally as a "gross margin," which represents the revenue associated with labor. Thereafter, expenses are separated into three categories: billable employee costs (including wages, benefits and employer taxes), non-billable employee costs (including wages, benefits and employer taxes), and overhead. Billable employees (also referred to herein as "direct labor") are those employees who actually perform a job or service (and who are directly billable in connection with a service that a business provides. Examples of billable employees include painters, plumbers, hairdressers, site foremen, attorneys, or the like. Non-billable employees (also referred to herein as "indirect labor") perform, for example, administrative functions such as associated with running an office. Examples of indirect or non-billable employees include secretaries, bookkeepers, and management. Overhead expenses are all other expenses of the company such as, for example, rent, water, gas, electric, insurance, supplies, travel or the like.

In most service-related businesses, labor represents the biggest expense. Understanding costs associated with billable labor is particularly useful to determine a total labor percent for billable employees in every labor dollar charged. Inputting a desired profit preferably modifies the billable labor percent of each dollar billed out in labor, so that desired profit can be achieved. The present invention automatically determines amounts to charge customers for labor, equipment and inventory by receiving associated cost information from a user, as well as a user-defined profit percentage.

In service companies, billing is typically based on respective services that are performed. Customers are typically charged for billable labor that employees or other providers provide for a company to cover the employer's costs of the labor and also to produce profit. Charging appropriately for billable labor is a significant concern for service providers. In accordance with a preferred embodiment, labor is quantified for billable employees based on each employee's respective production. Preferably, income-producing employees are separated into corresponding labor categories that are based on the employees' employment positions (e.g., supervisor, technician, assistants), thereby creating labor pools. Each employee preferably has a respective labor rate, and each category labor pool has an average labor rate. The labor pool rate is applicable when one of a plurality of employees, at least one of whom has a differing labor rate from another, performs a task.

Preferably, there are two variables that are defined for labor that enable a user to set billable labor expense(s): a production percent value and a billable labor percentage value.

The labor rate for billable employees is defined as follows:

$$((\text{employee cost per billable minute})*(\text{productivity factor}))/(\text{billable labor percent}).$$

Each of these variables (the employee cost billable per minute, the productivity factor and the billable labor percent) is described below.

Employers recognize that employee wages do not represent the only out-of-pocket expenses associated with employees. For example, insurance and other benefits, workers compensation, employer taxes, paid time off or the like also represent employment costs incurred by employers. In accordance with a preferred embodiment, wages, yearly bonus pay, yearly overtime pay, benefits, other employer employment costs, and employer taxes are added together and divided by billable time (e.g., hours or minutes) to derive an employee cost per billable minute ("CPBM") value. The cost per billable minute value determines how much an employee actually costs to an employer during each minute they are at work.

For example, a full time employee is paid $12 per hour and receives two weeks of paid vacation with no overtime or bonus. In a year having 52 weeks, and each week is 40 hours, the employee's wages equals $12×2,080 hours, or $24,960.00. Moreover, benefits associated with this example employee total $2,400.00, and employer taxes associated with this employee are $2153.00. The total employee cost to the business, therefore, is $29,513.00 (i.e., 24,960+2400+2153). Typically, billable time represents time when a billable employee is at work, and not on vacation or otherwise absent from work. The billable weeks preferably equals the "total paid weeks" minus "paid time off" (PTO). For this employee it would be the 52 paid weeks−2 weeks PTO or 50 weeks. The cost per billable minute ("CPBM") for this employee is equal to the total employee cost/(billable weeks×hours per week× minutes per hour)($29,513.00)/120,000((50×40×60)) =0.24594. Accordingly, the employee costs 24.594 cents every minute at work, whether the employee is billing or not. Continuing with this example, if this billable employee bills 40 hours out of a total of 40 hours in one week, charging $0.24594 per minute to a customer over the 50 weeks he is at work, covers the employer's costs associated with the billable employee. However, if the employee bills fewer than a full 40 hours, such as 35 hours per week, then a "productivity factor" is preferably applied, which represents a ratio of total hours worked to billable time.

For each billable employee, time may be spent performing billable work ("billable productive time") and time may be spent preparing for the job ("non-billable, non-productive time"). Non-billable, non-productive time for billable employees may include, for example, setting up equipment, picking up materials, ordering and receiving inventory for a job, staff meetings, providing price estimates, talking to a customer on the telephone, etc. The productivity factor represents such activity and is defined as:

productivity factor=total hours(during a work period)/ billable hours(during the work period).

In the above, a work period may be any period of time defined by an employer. For example, a work period may be a week, a month, a quarter year, a half year, an entire year or any other value.

The productivity factor is a multiplier that adjusts the cost per billable minute value as a function of non-billable time. For example, an employee works a 40-hour week and bills for 35 of those hours. Accordingly, (cost per billable minute) times (productivity factor) times (billable hours)×(60 min/hour)=($0.24594) times (40/40)×40 hours×60 min/hour=$590.25 (weekly wage). If the employee bills 35 out of 40 hours (i.e., 87.5% productive), then the productivity factor equals 40/35=1.1428. Continuing with this example, (cost per billable minute) times (productivity factor) times (billable hours) times (60 min/hour)=weekly wages:

0.24594×(1.1428)×35 hours×60 min/hour=$590.25 (weekly wage).

Moreover, the cost per billable minute ("CPBM") value (0.24594) times the productivity factor (1.1428)=0.28107 (28.10 cents a minute), which represents labor per minute (LPM).

This labor per minute value (LPM) is then charged out as a percent of gross margin, so that billable labor is established for every dollar billed.

The closer an employee's actual billable hours are to projected billable hours, the closer an employer is to achieving desired profit. In this way, a productivity variance can be established to measure the difference between projected and actual productivity. For example, if productivity for an employee is defined to be 80%, (e.g., 128 hours out of a month of 160 hours), and the employee actually bills 128 hours in the month, then the revenue earned by the employee covers the employee's respective costs, as well as a percentage share of non-billable labor, overhead, and desired profit.

A global default productivity factor is displayed in the example display screens shown in category calculation panel 20 (FIG. 1A), and is preferably editable by a user. Alternatively and in accordance with a preferred embodiment, a productivity factor can be defined for a category of employees. Thus, in accordance with the present invention, a productivity factor can be defined for each employee, for a category of employees, or defined globally for a business. Each employee can have a respective productivity factor which may overwrite a global default productivity factor or the productivity factor defined for a category of employees that represents projected billable hours during a respective month, week, day or other time period. In a preferred embodiment, a category production factor overrides the global default. Typically, a respective productivity factor is defined for each employee. This productivity factor preferably represents a quantified production goal defined for each employee.

In a preferred embodiment, employers ensure that productivity factors defined for employees are met. The production percent value defined for this employee is a goal that the employee should hit accurately. As noted above, the closer the employee is at attaining projected hours to actual billable hours is the closer that desired profit will be reached. If, for example, an employee is expected to be productive 80% of the time, then that employee need to bill 32 hours out of a 40 hour week. If, however, the employee is productive only 75% of the time, then the production factor can be changed for that employee to reflect his actual billable time.

The value representing the "billable labor percent" is preferably defined as a percentage of gross margin, which represents the difference between total sales and the cost of inventory. The billable labor percent is calculated by total billable employee cost divided by the gross margin. By dividing the labor per minute value by the billable labor percent, a billable labor percent is established for every dollar billed out. For example, if the billable labor percent is set at 20%, every labor dollar charged represents 20% billable labor, and 80% is used to cover costs (i.e., non-billable labor and overhead) and profit.

Referring back to the previous example based on 35 hours of billable time in a week, the cost per minute (0.24594) times the productivity factor (1.1428)=labor per minute (0.28106). In case a billable labor rate equals 20%, then a labor rate for this employee is defined to equal the labor per minute (0.28106) divided by the billable labor percent (20%)=$1.405 per minute. Thus, a labor rate that is charged to customers for this employee at is $1.405 per minute. Of the $1.405, 20% is represented as billable labor, and 80% represents known business costs and desired profit, as shown in FIG. 1A.

Continuing with the above example, in case time spent by this employee on a particular task is 10 minutes, the labor charged out equals $14.05 ($1.405 per minute×10 minutes), and 20% ($2.81) represents billable labor costs, 80% ($11.24) is applied to cover business costs (non-billable labor and overhead) and to generate the desired profit.

Thus, the present invention receives a profit percentage to be defined by a user, and a corresponding billable labor percentage is automatically calculated. The company global display screen shown in FIG. 1-A redefines a business income statement to account for billable labor, non-billable labor, overhead, and for a desired profit, The billable labor percentage is preferably set and controlled by the predefined profit percentage, and is preferably not modified for any one business. Instead, the billable labor is modifiable to express, for example, different product lines or companies where a respective company or product line has a respective income statement or defined revenues and costs (see below, with reference to FIGS. 1A and 10).

As noted above, preferably, a billable labor percentage is calculated based on the gross margin. This ensures that a customer is not charged twice for inventory (i.e., once in the billable labor percent and once again in services). Therefore, billable labor is associated with billable revenue.

The following is an example that represents how a billable labor percent is defined by the present invention, where profit is equal to 0%, and no inventory is used to provide the service:

total sales=(100%)−inventory(0%)=gross margin (100%)

gross margin−billable labor(55%)−non-billable labor (18%)−overhead(27%)=profit(0%). Or gross margin−profit(0%)−non-billable labor(18%)− overhead(27%)=billable labor(55%)

In the above example, revenue dollars associated with labor are recorded in sales but are applied in the gross margin value. The actual billable labor percent is 55% (e.g., 55/100 that represents billable labor/gross margin). Billable labor was costed out at 55% of every margin labor dollar, leaving 45% of every labor dollar to cover non-billable labor, overhead and produce a 0 profit.

The following is an example that represents how a billable labor percent value is defined by the present invention where profit is equal to 15%, and no inventory is used to provide the service:

total sales=(100%)−inventory(0%)=gross margin (100%)

gross margin−profit(15%)−non-billable labor(18%)− overhead(27%)=billable labor(40%)

In the above example, revenue dollars associated with labor are recorded in sales but are applied to gross margin. The fifteen percent profit recalculates the amount of billable labor to charge for every dollar associated with labor. The actual billable labor percent is 40% (i.e., 40/100, represented by billable labor/gross margin). Billable labor is costed out at 40% of every margin labor dollar, leaving 60% of every labor dollar to cover non-billable labor, overhead and produce a 15 profit.

The following is an example that represents how a billable labor percent value is defined by the present invention where profit is equal to 15%, and inventory that represents 20% of costs is used to provide the service:

total sales=(100%)−inventory(20%)=gross margin (80%)

gross margin−profit(15%)−non-billable labor(8%)− overhead(17%)=billable labor(40%).

In this example, the billable labor percent is 50% (i.e., 40% billable labor divided by 80% gross margin or 50%). Non-billable labor (8% divided by 80% or 10%)−overhead (17% divided by 80% or 21.25%)=profit (15% divided 80% or 18.75%). Therefore, using Gross margin, as 100% of labor dollars, 100% (gross margin)−50% (billable labor)−10% (non-billable labor)−21.75% (overhead)=18.75% profit When inventory costs are incurred, cost of goods sold ("COGS") is recorded in the present invention. When inventory is sold, it is recorded separately from other revenues. Inventory revenue dollars are reflected in the total sales value to offset the inventory (i.e., the cost of goods sold). If inventory levels consistently represent revenue, then sales of the marked-up inventory offset the costs and operate to produce profit. Preferably, margin billable percentages automatically convert to sales percentages when the cost of goods (inventory) is accounted for.

Thus, as described above and described and illustrated below, users affect a billable labor percent value (also referred to herein and in the corresponding reference figures as a "billable employee percent") by defining a profit percent. In the current embodiment, the owner would know the cost of billable labor, non-billable labor, overhead, and profit in every dollar of labor revenue.

Referring back to the previous example, based on 35 hours of billable time in a week, the cost per billable minute (0.24594) times the productivity factor (1.1428)=0.28106 (labor per minute). The labor rate (0.28106) is preferably divided by the billable labor percent which is defined by profit percent. Using the example above, where desired profit is 15%, billable labor set to 40%, non-billable labor is set to 18%, overhead is set to 27% (0.28106/40%=0.70265). In case the employee in this example is billed out at 70.265 cents a minute and works for 20 minutes, the labor charge equals $14.05. When the employee achieves his/her projected productivity goal, 40% of the $14.05 or $5.62 is attributable to billable labor, 18% of $14.05 or $2.53 is attributed to non-billable labor, 27% of 14.05 or $3.79 is attributed to overhead, and 15% of 14.05 or $2.10 is attributed to profit.

The present invention is operable to project different desired profits and to assist owners or employers to accurately determine prices to charge. Further, and in accordance with the teachings herein, the present invention operates to project different employees' costs, to assist employers to identify appropriate and accurate prices to charge, to project different employee production hours and to know prices to charge, to project a different overhead and to calculate prices to charge, to project a different non-billable employee cost and to know prices to charge, to know a profit value for every fee charged, to observe where an employers have guessed right or wrong on prices based on desired profit, to base fees on company specific cost structure, to lower overhead and to make each piece of equipment into a profit center and to set fees that employment staff will understand and appreciate.

Referring to the drawings now, in which like reference numerals refer to like elements, FIG. 1A shows an example "company globals" display screen 10 illustrating company current income statement values 12, current income statement percentages 14 and profit solutions percentages 16 according to a preferred embodiment of the present invention. Display screen 10 preferably enables a user to define global or "default" values that can be applied in various contexts, such as to define a labor percent or production percent in connection with a category of employees, or one or more individual employees. Many other global default values can be defined by the present invention, for example, service fee mark-up values in a services module (described below, with reference to FIG. 3) equipment return on investment values in a equipment module (FIG. 5), inventory mark-up values in a inventory module (FIG. 6), or the like. Reference is herein and in the drawings to "inherit" values, which represents applying default values in various contexts.

Example display screen 10 preferably includes data entry graphical screen controls that enable a user to set or change pricing for any desirable profit percent. Display screen 10 displays a company's income statement that users can redefine to display billable and non-billable employee costs. Billable employee costs preferably include wages, benefits and employer taxes. Users preferably enter those numbers in the graphical screen controls (e.g., textboxes, drop-down lists or the like) provided in display screen 10. Further, users enter a desired profit percent value that is used by the present invention to calculate or recalculate automatically the billable employee percent of every labor dollar billed. This percentage represents a percentage of revenue of billable labor that, when applied, leaves the corresponding difference in revenue applicable to non-billable employee costs, overhead and profit. For example, when the billable labor percent is set to 30, then 30% of every labor dollar in revenue is attributable to billable labor and 70% covers non-billable employee costs, overhead and profit. Preferably, after a user enters a desired profit percent value, the user assigns the calculated billable employee percent value for the company, for example, by selecting a graphical screen control, such as Use This Labor Percent button 18. When selected, the labor percent value, such as shown in FIG. 1A, is applied to employees of the company.

Continuing with reference to FIG. 1A, production factor section 20 is provided in display screen 10 for users to enter a value representing the total number of hours worked per period, and another value representing the number of those hours that represent billable time. The percentage of time that represents billable labor (i.e., the production percent) is automatically calculated, and preferably represents an average of all billable employees. The billable labor production percent represents, on average, the percentage of time that the billable employees actually bill during a given time period. Similar to the labor percent value, users can select Use This Production Percent button 22 to set a default productivity factor to be used for the company.

The company globals display screen 10 is a convenient and intuitive feature of the present invention that enables users to define a production percent and a desired profit percent that is preferably used by the present invention to automatically calculate a billable labor percent. Once the billable labor rate is calculated, a labor rate per minute is automatically calculated for each employee that, when charged to a customer, covers the employees' expense and a proportional share of nonbillable employee costs, overhead, and profit. Further, users enter income statement information, such as total sales, cost of goods sold, billable employee costs, and overhead. In current income statement percentages section 14, company income statement percentages are preferably displayed. For example, section 14 displays a total sales percent (representing 100%), a cost of goods sold percent (representing cost of goods sold divided by total sales), a gross margin percent (representing sales percent minus cost of goods sold percent), a billable employee percent (representing billable employee cost divided by total sales), a non-billable employee percent (representing non-billable employee cost divided by total sales), an overhead percent (representing overhead divided by total sales) and a profit percent (representing profit divided by total sales).

Further, display screen 10 includes profit solutions percentages percent section 16 that displays the impact profit has on the billable employee percent displayed in section 14. In the example current income statement percentages section 14 shown in FIG. 1A, the billable employee percent value is 44.00. In the profit solutions percentages section 16, however, the billable employee percent is reduced to 30.00, which represents that thirty percent of every billable dollar in labor revenue represents billable employee costs, that eight percent of every billable dollar in labor revenue represents costs associated with non-billable labor, that twenty-four percent of every billable dollar in labor revenue represents costs associated with overhead, and that eighteen percent of every billable dollar in labor revenue represents profit.

Thus, a user can use company globals display screen 10 to submit income statement information, define production percents and profit percentages. The present invention preferably uses the information to calculate percentages automatically. Further the user can set default values via the display screen 10. In accordance with one embodiment, a user manually enters income statement information, for example, from an external data source such as a commercially available accounting software package. In another embodiment, data are imported from external sources, such as commercially available accounting packages. In yet another alternative, the present invention is integrated within an accounting package and operates as a module therein. In this alternative embodiment, data flow automatically such that various graphical controls, such as the total sales textbox, are automatically populated.

FIG. 1B illustrates an example hardware arrangement according to a first embodiment of the present invention, and referred to herein, generally, as system 100. In the embodiment shown in FIG. 1B, system 100 comprises at least one information processor 102 and one or more workstations 104. Information processor 102 is preferably configured to operate as an internet web server and is further operable to access and update a database. Information processor 102 accesses communication network 106 and communicates with workstations 104, such that workstations 104 are operable to transmit and receive data there-between. Communication network 106 can be any network, and is preferably the internet. Preferably, workstations 104 and information processor 102 communicate via the known communications protocol, Transmission Control Protocol/Internet Protocol ("TCP/IP"). Also and as illustrated in FIG. 1B, some of the workstations 104 are configured with output printers 108, as known in the art.

In a preferred embodiment, a workstation 104 is configured with a software application, which operates as stand-alone executable software, as known in the art. In this way, workstation 104 implements many of the features described herein without a need to maintain a communication session on network 106. Thus, workstation 104 can be "off-line" when the application software is installed thereon. In an alternative embodiment, workstation 104 operates standard web browsing software and communicates with information processor 102. In this alternative embodiment, the features described herein are provided to a user operating workstation 104 via information processor 102 during an active communication session over the internet or other communication network. Accordingly, display screens and graphical screen controls enabling a user to calculate service fees are provided while workstation 104 is "on-line" via communication network 106. In yet another alternative, workstations 104 receive updates and/or patches, as known in the art, from information processor 102 via communication network 106.

Information processor 102 and workstations 104 are preferably any devices that are capable of sending and receiving data across communication network 106, e.g., mainframe computers, mini computers, personal computers, laptop computers, a personal digital assistants (PDA) and internet access devices such as Web TV. In addition, information processor 102 and workstations 104 are preferably equipped with a web browser, such as MICROSOFT INTERNET EXPLORER, NETSCAPE NAVIGATOR, MOZILLA FIRREFOX or the like. Thus, as envisioned herein, information processor 102 and/or workstations 104 are devices that can communicate over a network and can be operated anywhere.

The nature of the present invention is such that one skilled in the art of writing computer executable code (i.e., software) can implement the described functions using one or more of a combination of popular computer programming languages and developing environments including, but not limited to C, C++, Visual Basic, JAVA, PHP, HTML, XML, ACTIVE SERVER PAGES, JAVA servlets, MICROSOFT .NET, C#, ASP.NET, and a plurality of various development applications.

For example, data may be configured in a MICROSOFT EXCEL spreadsheet file, as a comma delimited ASCII text file, as a MICROSOFT SQL SERVER compatible table file (e.g., MS-ACCESS table), or the like. In another embodiment, data may be formatted as an image file (e.g., TIFF, JPG, BMP, GIF, or the like). In yet another embodiment, data may be stored in an ADOBE ACROBAT PDF file. Preferably, one or more data formatting and/or normalization routines are provided that manage data received from one or a plurality of sources. In another example, data are received that are provided in a particular format (e.g., MICROSOFT EXCEL), and programming routines are executed that convert the data to another formatted (e.g., ASCII comma-delimited text).

Furthermore, data entered by users and stored by the present invention can be exported to one or more formats for third-party software applications. Alternatively, data in a particular format can be imported into the present invention. For example, data can be imported to or exported from a computer software accounting program. In this way, various functionality provided by other software programs can be provided from data originating from users of the present invention.

It is contemplated herein that any suitable operating system can be used on workstations 104 and information processor 102, for example, DOS, WINDOWS 3.x, WINDOWS 95, WINDOWS 98, WINDOWS NT, WINDOWS 2000, WINDOWS XP, WINDOWS VISTA, WINDOWS CE, WINDOWS POCKET PC, MAC OS, UNIX, LINUX, PALM OS, POCKET PC or any other suitable operating system. Of course, one skilled in the art will recognize that other operating systems are or will be available.

Moreover, a plurality of data file types is envisioned herein. For example, the present invention preferably supports various suitable multi-media file types, including (but not limited to) JPEG, BMP, GIF, TIFF, MPEG, AVI, SWF, RAW or the like (as known to those skilled in the art).

Figure 2:
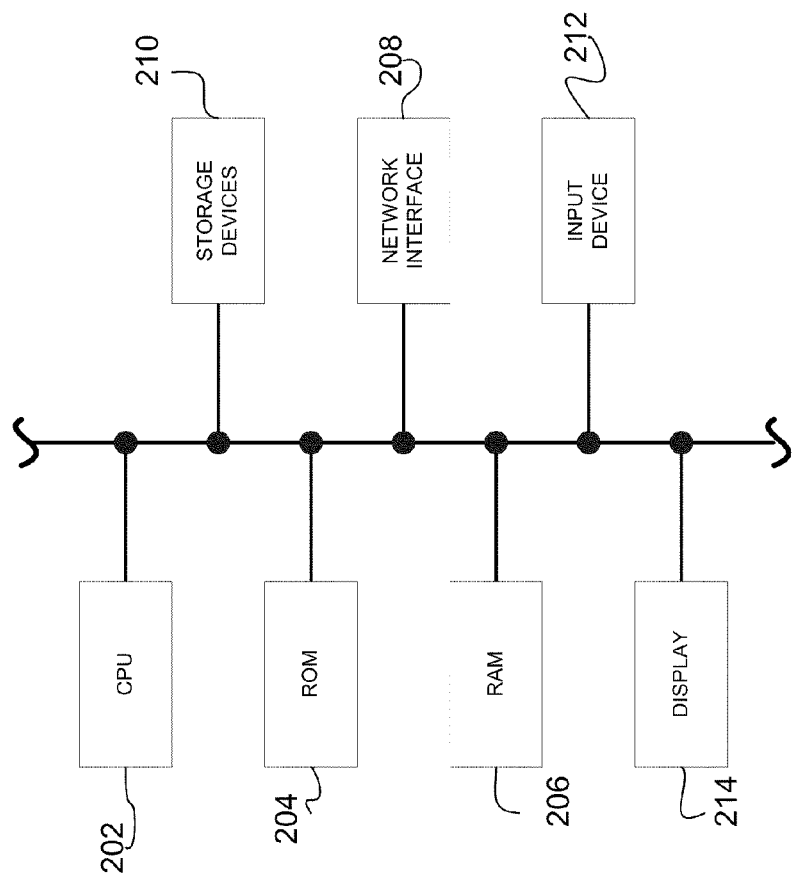
FIG. 2 illustrates the functional elements of a workstation and/or information processor.

FIG. 2 illustrates the functional elements of workstation 104 and/or information processor 102. The functional elements include one or more central processing units (CPU) 202 used to execute software code and control the operation of workstation 104 or information processor 102, read-only memory (ROM) 204, random access memory (RAM) 206, one or more network interfaces 208 to transmit and receive data to and from other computing devices across a communication network, storage devices 210 such as a hard disk drive, floppy disk drive, tape drive, CD ROM or DVD for storing program code, databases and application data, one or more input devices 212 such as a keyboard, mouse, track ball, magnetic card reading device, bar code reading device, microphone or the like, and a display 214.

The various components of information processor 102 and/or workstation 104 need not be physically contained within the same chassis or even located in a single location. For example, storage device 210 may be located at a site which is remote from the remaining elements of information processor 102 or workstation 104, and may even be connected to CPU 202 across communication network 106 via network interface 208. Information processor 102 preferably includes a memory equipped with sufficient storage to provide the necessary databases, forums, and other community services as well as acting as a web server for communicating hypertext mark-up language (HTML), FLASH, Action Script, Java, Active Server Pages, Active-X control programs on workstations 104. Information processor 102 are arranged with components, for example, those shown in FIG. 2, suitable for the expected operating environment of information processor 102. The CPU(s) 202, network interface(s) 208 and memory and storage devices are selected to ensure that capacities are arranged to accommodate expected demand.

As used herein, the term, "module" refers, generally, to one or more discrete components that contribute to the effectiveness of the present invention. Modules can operate or, alternatively, depend upon one or more other modules in order to function.

Figure 3:
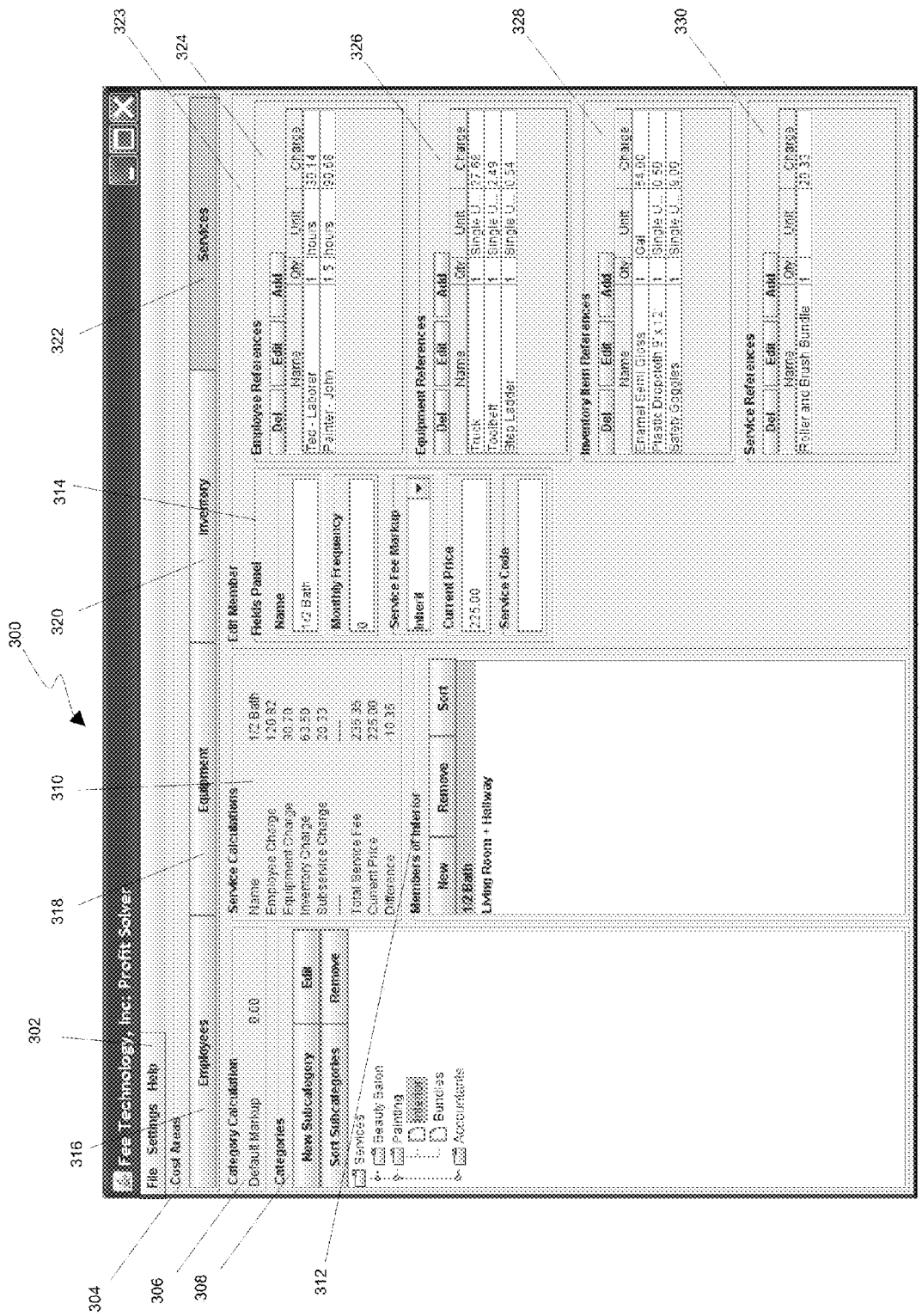
FIG. 3 illustrates an example display screen that is provided to a user in connection with a preferred embodiment of the present invention in connection with viewing and editing service-related information.

FIG. 3 illustrates an example display screen 300 that is provided in connection with a preferred embodiment for viewing and editing a service. The workspace preferably includes defined portions including, for example, menu bar 302 that includes menu choices for File, Settings, and Help. Moreover, cost areas section 304 is operable for users to select modules for employees, equipment, inventory and services.

Further, category calculation panel 306 displays category default values and average rates for a selected category. Category panel 308 preferably creates and displays a tree of categories and subcategories, including of sub-items within the active module (i.e., employees, equipment, inventory and services). Member calculation panel 310 preferably displays calculations from a detail input panel. Moreover, members panel 312 preferably includes sub-items or members of the active category, and detail input panel 314 that enables a user to input and display data related to an active member.

Continuing with reference to example display screen 300 in FIG. 3, four primary cost areas or modules are provided: employees cost area 316, equipment cost area 318, inventory cost area 320 and service cost area 322. In the example shown in FIG. 3, service cost area 322 is selected and the various values displayed in sections 304, 306, 308, 310, 312 and 314 represent service-related information. Further, the example display screen 300 shown in FIG. 3 represents a company that specializes in painting services, but, as will become clear to one skilled in the art, any service business will have the same cost areas 316, 318, 320 and 322.

As shown in example display screen 300, an overview is displayed for any service and preferably includes member panel 323 and, more particularly, employee references section 324 that shows all billable employees associated with a respective service. Further, equipment references section 326 shows equipment used in connection with a service task, and inventory references section 328 shows inventory that is used in connection with a particular service. Further, a services reference section 330 identifies costs associated with sub-services that form at least part of a respective service.

Continuing with reference to the example display screen 300 shown in FIG. 3, member calculation panel 310 is provided and represents services, and displays a selected service name. Panel 310 further displays employee charges, which preferably cover expenses associated with employees, as well as other expenses a company incurs, and achieves the desired profit. Moreover, in panel 310, a value representing equipment charges is shown that represents, maintenance and supplies costs and applicable mark-up, return on investment, and costs associated with replacing the equipment. Further, panel 310 identifies charges associated with inventory covering inventory costs plus a mark-up, effectively offsetting cost of goods sold in connection with a business.

Figure 4:
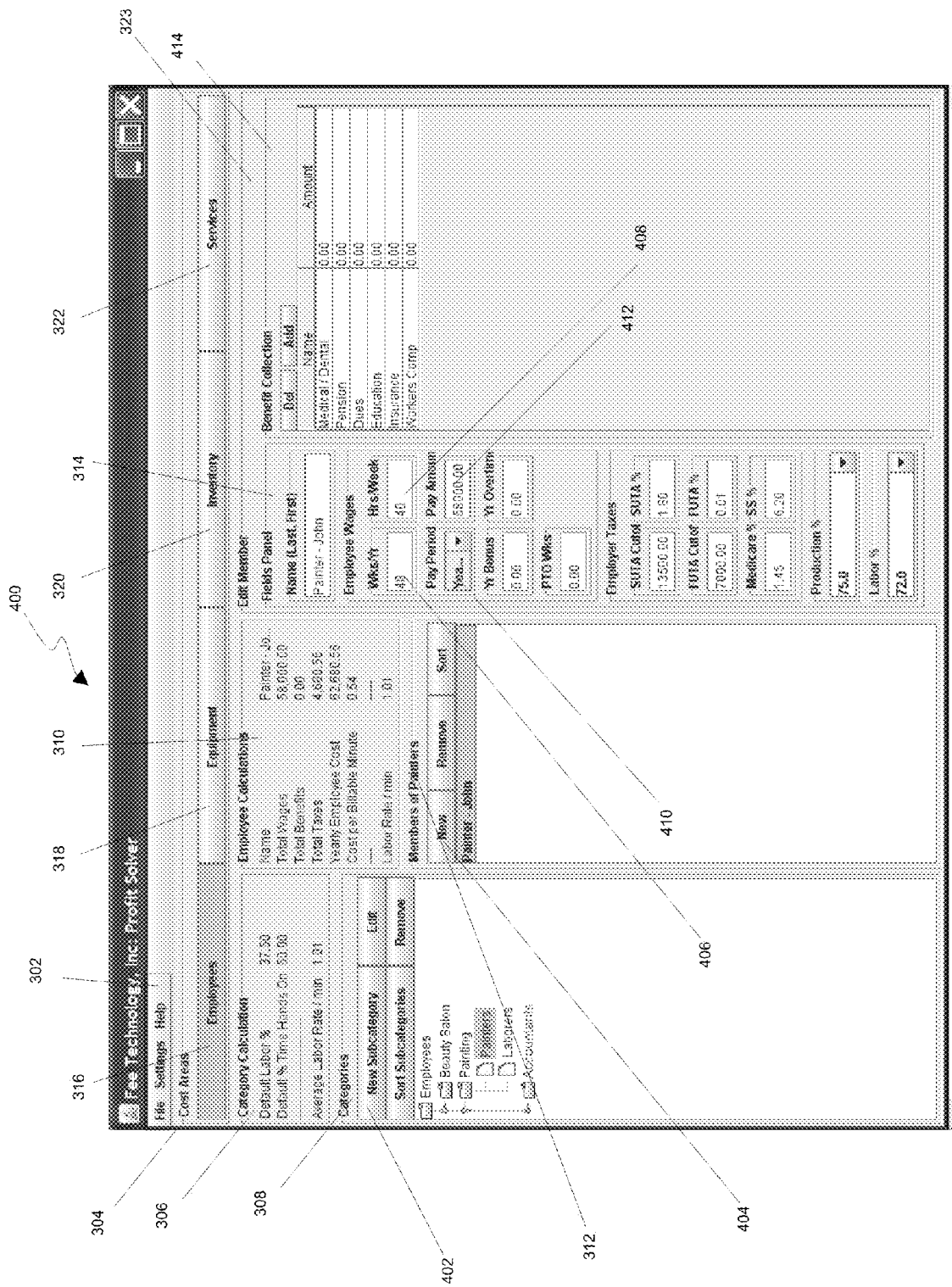
FIG. 4 shows another example display screen that is provided to a user in connection with viewing and editing employee data.

FIG. 4 illustrates an example display screen 400 that is provided in connection with a preferred embodiment for viewing and editing employee data. Display screen 400 is preferably displayed when a user selects employees cost area 316 in cost areas section 304. Preferably, once employees cost area 316 is selected, the user is prompted to provide proper authorization, such as by entering a password. In a preferred embodiment, employee data is password protected.

Preferably, display screen 400 is operable for a user to add/edit one or more employee categories that represent particular types of employee, as well as to add/edit individual employee data. In the example shown in FIG. 4, the employee categories shown in category panel 308 include painters and laborers. To add a new employee category, a user preferably selects new subcategory button 402. A category name is, thereafter, entered for the new type of employees, and the user confirms the entry, for example, by selecting a graphical button. Preferably, a different category is created for each type of employee, and individual labor rates or, alternatively, labor pools are created from which to charge a customer a fee for labor. Multiple employee levels may be used to define the various labor pools.

When a user adds a new employee category, the user has an option to apply or "inherit" a global production factor value that is indicative of the billed time within a period that represents an average for the employees in that category. If necessary, this category value is preferably modified by the user to reflect an accurate average representation of all the employee's actual billable time who are placed in that category. Unlike the global production value, a labor percentage value is preferably also inherited by a user and not modified because the labor percentage value is based on profit and should only be changed, for example, in case multiple product lines are used and or multiple companies are input.

As noted above, display screen 400 is also operable for a user to add/edit individual employee data. As shown FIG. 4, the user selects an appropriate category of employee in the category panel 312. Thereafter, the user selects New button 404 in the member identifier panel 312. In the member panel 323, the user enters/edits the employee's name. In the Wks/Yr textbox 406, the user enters the number of paid work weeks during one year. Preferably, this value represents weeks actually worked, and includes vacation time, sick time, personal days or the like. In the Hrs/week textbox 408, the user preferably enters the number of total work hours per week. In the Pay Period textbox 410, the user preferably selects either whether the employee is an hourly-based employee, or a salary-based employee. In the Pay Amount textbox 412, the user selects either the hourly-based employee's paid amount per hour or, alternatively, the annual wage for a salary-based employee. Other values that are submitted by the user include an annual bonus, annual over time and paid time off values, if applicable. Furthermore, in the member calculation panel, values including total wages, total benefits, total employer taxes, total employee cost, labor rate and average rate preferably calculate automatically based on the rate, for example, submitted by the user.

In addition to costs associated with employer taxes, an employer may incur costs associated with employee, such as medical or dental insurance, pension, dues, education, insurance or workmen's compensation. These values are preferably entered by the user in benefits collection panel 414, and are preferably factored into the calculation panel 310 when calculating a labor rate per minute value.

Continuing with reference to FIG. 4, category calculation panel 306 includes values for default labor percentage based on gross margin, default production percentage representing the global default average billable time that an employee performs hands-on labor and an average labor rate per minute value for the category. A value entered in the member production percent or the member labor percent preferably overwrites the category default and the global default. As used herein, the value representing the labor rate per minute represents the charge for labor performed by a respective employee during a single minute. The average labor rate values represent an average value charged for labor performed by all employees of a respective category during a single minute.

Figure 5:
FIG. 5 shows yet another example display screen that is provided to a user in connection with viewing and editing equipment data.

FIG. 5 illustrates an example display screen 500 that is provided in connection with a preferred embodiment for viewing and editing equipment data. In a preferred embodiment, at least part of the price of a service charged to a customer includes costs associated with equipment. Rather than being a liability to a business, equipment is preferably represented and treated as a profit center. The present invention preferably automatically calculates per use fees associated a replacement of equipment, a return on investment for the equipment, maintenance of equipment and supplies associated costs per use, and a mark-up or profit placed on those supplies and maintenance items.

In a preferred embodiment, a user selects equipment cost area 318 control to display category calculation panel 306, category panel 308, and member calculation panel 310 that present equipment related information for a user to add and/or edit. Similar to the panels provided in display screens 300 and 400, a user selects new sub-category control 402 to add a new category of equipment, and selects new button 404 in the member identifier panel 312 to add new equipment. Further, the user can select an option to inherit one or more values to be applied during calculation of fees for services that use respective equipment. For example, a global return on investment (ROI) percent can be applied to all equipment to generate a return on investment as well as a global mark-up value applied to all equipment costs associated with supplies and maintenance to generate profit. In a preferred embodiment, users can define a global mark-up value that is operable to affect fees associated with equipment, including for return on investment, supplies and maintenance. The global ROI and supply mark-up values are preferably added/edited by selecting the equipment category (the top most level category) and selecting the edit button. A value placed in the global ROI and mark-up preferably applies to all subcategories and members in each category. Furthermore, a ROI and mark-up can be applied at the subcategory level by selecting a respective subcategory, and, thereafter, selecting the edit button. A return on investment or mark-up value is preferably applied to that specific category and all members within that category. The member ROI and supply mark-up preferably overwrites the category and global default value(s), and is applied just to the respective equipment. Accordingly, and in accordance with a preferred embodiment, a member overwrites a category, and a category overwrites a global default value. As noted above, inherit is used to show that a respective value is inherited from a global ROI and or mark-up, unless overwritten at the category level. For example, to provide a return of investment and mark-up value of 10% to a single piece of equipment, the user submits in the equipment ROI textbox 502 the value 10. Moreover, to provide a mark-up of 10% to be applied supplies and maintenance costs, the user submits the value 10 in the COPU mark-up textbox 504.

In an ordinary course of business, equipment fails and the owners must pay for a new replacement machine. In accordance with the preferred embodiments, customers of the owner pay for the new replacement machine over the lifespan of the equipment based on usage. In a preferred embodiment, three default values are available for a user to select in units 505: single use, minutes and hours. Preferably any other value can be used and typed directly into the units 505. An example of another type of usage is a vehicle that is charged out based on mileage. Each customer is preferably charged his/her fair share of the equipment used on their job or service, based on a value representing the usage over the course of the year and the expected life span of the equipment. In a preferred embodiment, owners receive revenue that is allocated for replacement costs, and owners saves the revenue therefrom in a separate financial account that is allocated particularly for new equipment purchasing. In this way, money that is allocated especially for replacing equipment is not commingled with other funds.

Continuing with reference to FIG. 5, the user adds and/or edits information in the member panel 323 that corresponds with a particular piece of equipment. As shown in the example display screen 500, a flat brush is selected in category panel 312 and information corresponding to the equipment name, purchase price, years of life (life span) and units are preferably displayed. The units represent how a piece of equipment is used, for example, the frequency a piece of equipment is used, how long a piece of equipment is used, or the number of times that a piece of equipment is used over the course of time, such as a year.

Some equipment requires operating supplies in order to function. For these types of equipment, operating supply panel 506 presents information representing operating supplies, and enables the user to add or edit the name of a supply item and the associated costs thereof. Furthermore, in maintenance item panel 508, a user can add and/or edit maintenance related information for equipment. For example, the user is provided with an option to add and/or edit the name of a maintenance item and an annual cost of a maintenance item.

In a preferred embodiment, replacement cost per use, yearly return on investment, maintenance and supply cost per use, yearly maintenance and supply profit (mark-up) and total equipment charge per use are calculated automatically. These values are preferably calculated as a function of annual costs, and are used by the present invention to calculate service fees on a per use basis. For example, a piece of equipment that costs $10,000.00, has a life span often years and is used a thousand times per year is calculated to have a $1.00 per use replacement charge. This is calculated by dividing the cost of the equipment ($10,000.00) by the life span (10) and thereafter, dividing by the number of times per year the equipment is used (1000), (($10,000/10)/1000), resulting in a $1.00 per use charge. Continuing with this example, if a customer is charged $1.00 per use, then in one year the equipment owner recovers the $1,000.00 per year charge and, accordingly, the $10,000.00 over the course of the equipment's life span. After ten years when the equipment fails, the customers have effectively paid for replacement equipment, $1.00 at a time.

Beyond merely recovering replacement costs, however, as noted above, the present invention treats equipment as a potential profit center. Accordingly, a return on investment can be specified to generate an annual financial return on the investment. For example, if the user specifies the value 10, for a 10% ROI in the equipment ROI textbox 502, then the return on investment per year would be $100.00. This is calculated by multiplying the cost of the equipment ($10,000.00) by the ROI (10%), and thereafter dividing by the life span (10). (($10,000*0.10)/10) Over the life span of 10 years the owner receives $1000.00 ($100.00 per yr*10) or a 10% return on the investment of $10,000. The present invention preferably calculates a per use value for ROI. The ROI per use value is equal to 10 cents, and is calculated by dividing the yearly return on investment ($100) by the number of uses per year (1000). Continuing with the previous example, the replacement cost per use of $1.00 plus the ROI per use of 10 cents results in a $1.10 per use charge for the equipment. In one year the owner would receive $1,100.00 ($1.10*1000 uses) and after ten years, the owner receives $11,000. In ten years, when the equipment fails, not only have customers paid for a new machine $1.00 at a time, the owner has enjoyed a $1,000.00 profit.

Also in accordance with a preferred embodiment, when equipment is purchased, costs are associated with the equipment for maintenance and supplies that keep the equipment operational. For example, costs are incurred that include calibration, insurance, maintenance, parts and supplies or the like. Accordingly, each customer is preferably charged his or her fair share of those maintenance and supply costs based on the use of the equipment in the course of providing services. For example, a piece of equipment having a ten year life span costs $10,000.00 is used 1,000.00 time per year and maintenance and supplies for the equipment have an annual cost of $500.00. Dividing the annual maintenance and supply cost by the number of uses per year ($500.00/1,000) an additional $0.50 charge is associated with use of the machine. In this way, at the end of one year of equipment use, the owner receives an additional $500 to cover the cost of maintenance and supplies. The customer reimburses the owner for the customer's fair share of cost that, in the prior art, is considered overhead. In this regard, overhead expenses decrease by the amount of reimbursement.

Moreover, in accordance with a preferred embodiment, a mark-up is applied to the cost associated with maintenance and supplies that is preferably specified in COPU mark-up textbox 504. For example, if the mark-up value is 10, then an additional 10% is added to the per use fee associated with maintenance and supplies of equipment. Continuing with the previous example, 10% is added to the per use $0.50 charge associated with the maintenance and supplies of the equipment, resulting in a $0.55 charge. Therefore, the total service cost per use of equipment to charge a customer is the replacement cost of the equipment plus a return on investment of the equipment plus the costs associated with the maintenance and supplies plus an additional mark-up on the maintenance and supplies.

In this embodiment, a simple mark-up is used as labor covers all cost and produces a desired profit. Any mark-up applied to equipment will fall to the bottom line. Calculation for a operating supply and maintenance mark-up is defined as follows:

Supplies and maintenance total yearly cost*mark-up %=profit. Profit divided by units used per year=profit per use. In the previous example if total supply and maintenance yearly cost=$500 and a 10% mark-up applied, profit would equal $50.00. $50.00 profit divided by 1000 uses equals a charge of $0.05 per use for profit on maintenance and supply costs.

Continuing with the previous example, the per use charge associated with the equipment equals $1.10 (replacement cost per use of the equipment plus the return on investment charge per use) plus $0.55 (maintenance and supplies cost per use plus mark-up per use) totaling $1.65 per use.

Thus, in accordance with a preferred embodiment, equipment costs are transformed from expenses to profits, in an accurate and fair way.

Figure 6:
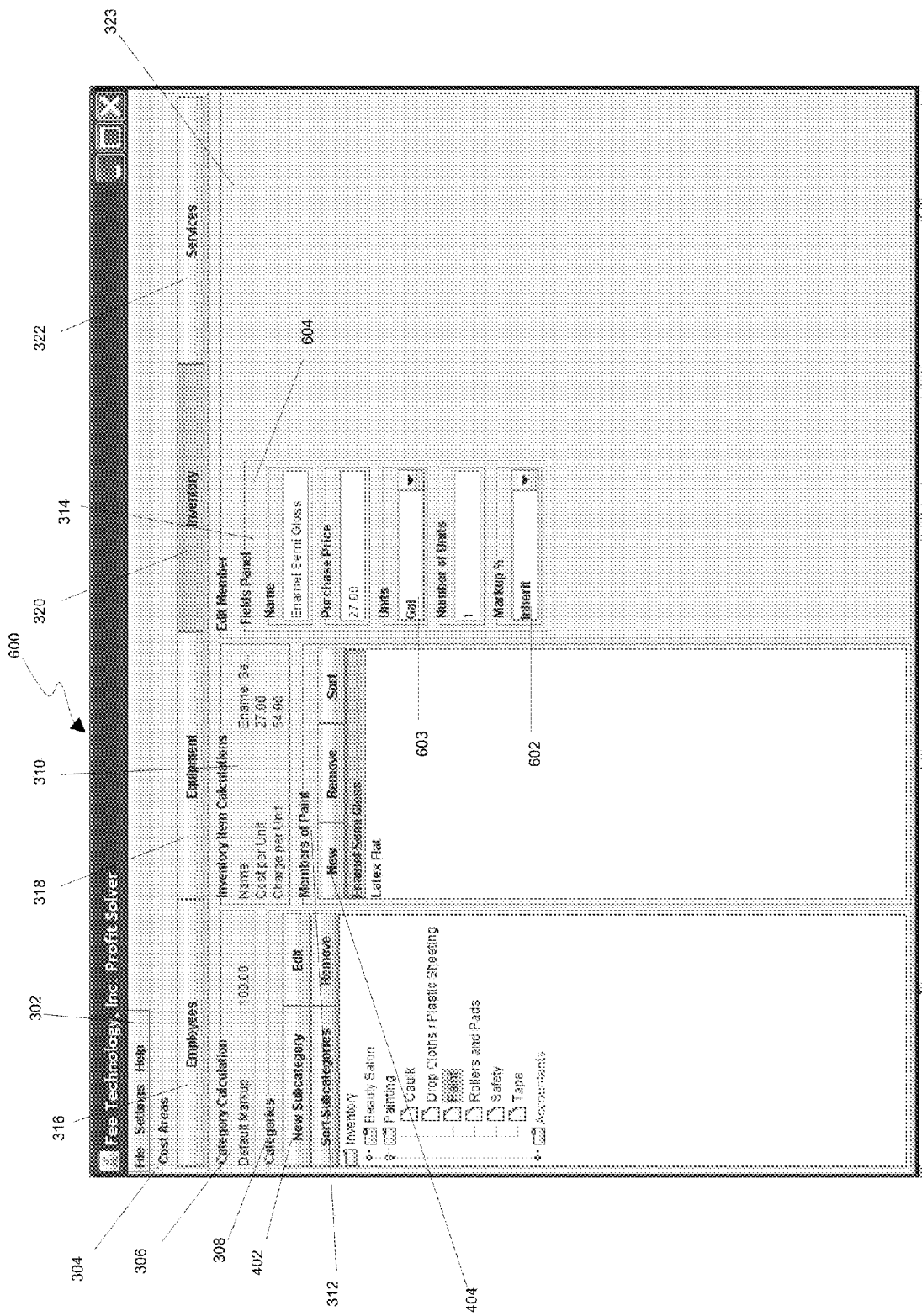
FIG. 6 shows another example display screen that is provided to a user in connection with viewing and editing inventory data.

FIG. 6 illustrates an example display screen 600 that is provided in connection with a preferred embodiment for viewing and editing inventory data and outside services. Preferably, outside services are treated like inventory in at least one respect, a cost is incurred and a mark-up applied before charging the customer. In this context of a mark-up applied to cost, outside services are placed in the inventory module. Display screen 600 is preferably displayed when a user selects inventory cost area 320 in cost areas section 304. Preferably, once inventory cost area 320 is selected, the user is prompted to submit information representing inventory and or outside services in categories panel 308, members panel 312 and member section 323. Similar to the fees described above and associated with employees and equipment, part of the price charged for services in accordance with the present invention includes the price of inventory and any sub services, plus price-mark-ups that are used in connection with providing a service. Each inventory item is preferably identified by various characteristics and factored into service fees in accordance with a per unit charge. Preferably, units 603 provides three default values for a user to select: item, gallon or ml. Preferably, any other value can be used and typed directly into units 603 by a user. Similar to the panels described above in display screens 500 and 400, categories of inventory are provided in category panel 308. In the example shown in FIG. 6, the inventory, paint, is selected. In category panel 308, the particular item enamel semi gloss paint is selected in member panel 312. If a user desires to add a new category or a new member, the user selects new sub-category button 402 for a new members button 404 for a new category of inventory or a new member thereof. Preferably, the user is prompted to provide a global mark-up value in mark-up percent textbox 602 that is applied to all inventory items. Alternatively, the user can inherit a default mark-up value found in the inventory category (top most level category). In accordance with a preferred embodiment, the mark-up percent applied at the top most level is applied to all subcategories and to all inventory members of a respective category.

In member panel 323, a field panel 604 is provided that enables the user to submit information for a selected and/or new inventory item. For example, the user is provided with the name, purchase price, unit type, number of units and mark-up percent in panel 604. In the example shown in FIG. 6, the enamel semi-gloss paint item is displayed with a purchase price of $27.00, the unit is provided in gallons, with 1 gallon selected, and a price-mark-up percent value that is inherited from a default value. The global inventory mark-up can be added/edited by selecting the inventory category (the top most level category), and, preferably by selecting the edit button. A value placed in the global inventory mark-up preferably applies to all subcategories and members in each category. Furthermore, a mark-up can be applied at the subcategory level by selecting the appropriate subcategory, and selecting the edit button. In this case, the mark-up is preferably applied just to the selected category, and all members within that category. The inventory member mark-up preferably overwrites the category value and global default, and applies just to that piece of inventory. As noted above, a member value overwrites a category value, and a category value overwrites a global default value. Inherit is used to show that the field will inherit its value from the global mark-up unless overwritten at the category level. In a preferred embodiment, as with virtually all data elements provided by the present invention, the user can edit any value displayed in a data entry display screen.

Preferably, price-mark-ups are applied to inventory that represents a percentage value and is multiplied to the purchase price of the inventory. In the example shown in FIG. 6, the mark-up is 100%, as reflected in member calculation panel 310. The cost per unit is $27.00 and the charge per unit is $54.00, representing a mark-up of 100%. In this way, inventory, as in equipment, represents a profit center rather than an expense that contributes to the overall profitability of a service business. In typical accounting there are two types of mark-ups: one is used in the retailing industry and is a type of mark-up used to cover other costs. In a preferred embodiment of the present invention, a simple mark-up is used as labor covers all cost and produces a desired profit. Any mark-up applied to inventory will fall to the bottom line.

Calculations to charge for inventory, and simple mark-up is defined as follows: Cost per unit ($27.00) multiplied by mark-up % (100%)=profit ($27.00). Profit (27.00)+Cost ($27.00) =Charge per unit ($54.00). By charging the customer $54.00 a $27.00 profit is made on an item that cost $27.00. A mark-up % can be derived from any item charged by using the following formula. (Sales price−cost)/cost. In the previous example, ($54.00−$27.00)/$27.00=100% mark-up.

Referring back now to FIG. 3, a user selects service cost area 322 to display service business information, such as the person(s) who perform a task, the respective equipment that is used and the inventory that is used for the service. Revenue for the respective service business is earned as a function of labor, equipment and inventory. Labor is priced to cover expenses related to billable labor, non-billable labor, overhead, and further derives a profit. Labor is not charged out to cover inventory. Equipment revenue, as noted above, should be separately handled from revenue that results from labor and inventory, and is preferably set aside in a separate financial account to purchase new equipment and/or to replace existing equipment. Inventory revenue preferably covers inventory costs that are purchased during a respective month and preferably offsets the price associated with inventory that is sold during the course of providing a service. As noted above, a mark-up is preferably placed on inventory, however, this mark-up should not be construed as a major component of an industry's profit, because profit is preferably derived largely from labor. Therefore, a reasonable and fair mark-up on inventory costs should be applied. In case a user believes that the respective mark-ups and return on investments for equipment, inventory and services is not sufficient, a service fee mark-up can be applied to any service that increases or decreases the price, respectively. This service-fee mark-up can adjust prices to reflect any preferred scenario. The service-fee mark-up increases the price of a service by adding the percent amount to the total service fee. An example would be a service that the total service fee=$100.00. A service mark-up of 2% would increase the total service fee by $2.00 (2% of $100) resulting in the total service fee of $102.00. A global service-fee mark-up could be defined by a user, for example, by selecting the service category (the top most level category) and selecting the edit button. A value placed in the global service-fee mark-up will apply to all subcategories and members in each category. Furthermore, a service-fee mark-up can be applied at the subcategory level by selecting on the appropriate subcategory and selecting the edit button. This will apply a service-fee mark-up just to that specific category and all members within that category. In the member area 323, the service-fee mark-up overwrites the category service-fee mark-up value and global default service-fee mark-up value, and will apply just to that service. In essence, the member overwrites the category, and the category overwrites the global default.

When services are competitively priced, business use loss leaders, as known in the art. As used herein, loss leaders refer to prices that have been intentionally lowered to be competitive. It is also the case where most businesses profits are derived from high frequency services. In businesses, it is not the services performed once a year that create most of the profit, it the high frequency services performed that create the large percent of profit. In this embodiment, the service-fee mark-up can be applied to non shopped high frequency services to increase those individual prices to offset loss leaders.

In a preferred embodiment, a frequency value can be applied to any service. The frequency value can be used to forecast profits, to determine whether there is enough business to hire additional employees, to establish a figure to set aside equipment revenue, to figure out the dollar value of monthly inventory mark-up, or to forecast revenues.

As noted above, some services include various tasks or "sub-services" that are required. Any service that is defined by a user and submitted in the present invention can be applied, thereafter, as a sub-service within another service. Once the service is defined, for example, in display screen 300, a user does not have to re-define the service to re-use it.

In a preferred embodiment, billable labor that is provided in connection with a respective service can be accounted for in various ways, such as individual labor rates, a combination of labor rates for a plurality of employees, a category rate or a plurality of category rates. Moreover, labor can be represented in various measurements of time, such as minutes or hours.

In the example shown in FIG. 3, the category of service that is highlighted is interior painting, and the particular member of the interior is a ½-bath. It is estimated that the painter, John, requires 1½ hours to paint the ½-bath, and the laborer, Ted, requires 1 hour. In an example such as this and the user knows who is working on a respective job, the user can track the number of hours that are actually filled and a production variance can be established that, as noted above, represents a ratio of hours billed versus production goal hours that were set. By viewing the production variance, and employee's or other service provider's relative performance can be evaluated.

In other cases, the user may not know who will work on a particular task. The user may know, for example, that one of several known people will work on the task. As noted above, an average labor rate can be calculated for a plurality of employees or service providers automatically by the present invention. For example, it may be known that an assistant or other technical person may contribute to a service. However, each person's respective contribution may not be easy to identify or otherwise determine. Accordingly, the selected employer labor rates are preferably averaged by the present invention, thereby accounting for various wage differences paid to respective service providers (e.g., employees) within a single category, regardless who actually performs the respective task.

Figure 7:
FIG. 7 illustrates yet another example display screen that is presented when a user desires to add a new employee to a service task.

In the example shown in FIG. 3, John is the only painter who is assigned to paint the ½-bath. FIG. 7 illustrates an example display screen 700 that is presented when a user desires to add a new employee to a service task. In the example shown in FIG. 7, another painter (Jim) may be assigned to paint the ½-bath, although the user is not sure whether Jim or John will perform the service. Further, it is possible that Jim will paint for part of the time, and John will paint for the remainder of the time. Thus and in accordance with a preferred embodiment, the category of painters that includes Jim and John is selected, and the category of painters is added to the service in employee reference section 324. As shown in FIG. 7, only the laborer, Ted, is listed in the employee reference section 324.

In accordance with a preferred embodiment, a user selects one or more categories of employees, or one or more individuals to be assigned to a service task. To select a category average labor rate, the user preferably selects a category and selects the category "add to selection" button (located above the categories). When more than one category is selected to combine average category labor rates, the user must type in a user-defined name for the listing (e.g., "Painters—Laborers") in the name field to identify the selection. To select an employee click on the employee and click the member "add to selection" button (above the employees). When more than one employee is selected to combine and average employee labor rates, the user preferably enters in a user-defined name for the listing (e.g., "Painters—Jim or John") in the name field to identify the selection. If the user selects a category of employees, then the category is listed in the employee reference section 324 and an average employee charge is calculated therefor. As shown in FIG. 7, the category, painters, is selected in category section 702, and the user preferably selects the category Add to Selection button control 704 to add and display the added category in selected items section 706. Further, the user inputs the amount of time that the employees are expected to need to complete the task. The user selects hours instead of minutes by clicking the down arrow in the unit type field. After the user is satisfied with the selections, Confirm button 710 is selected.

Figure 8:
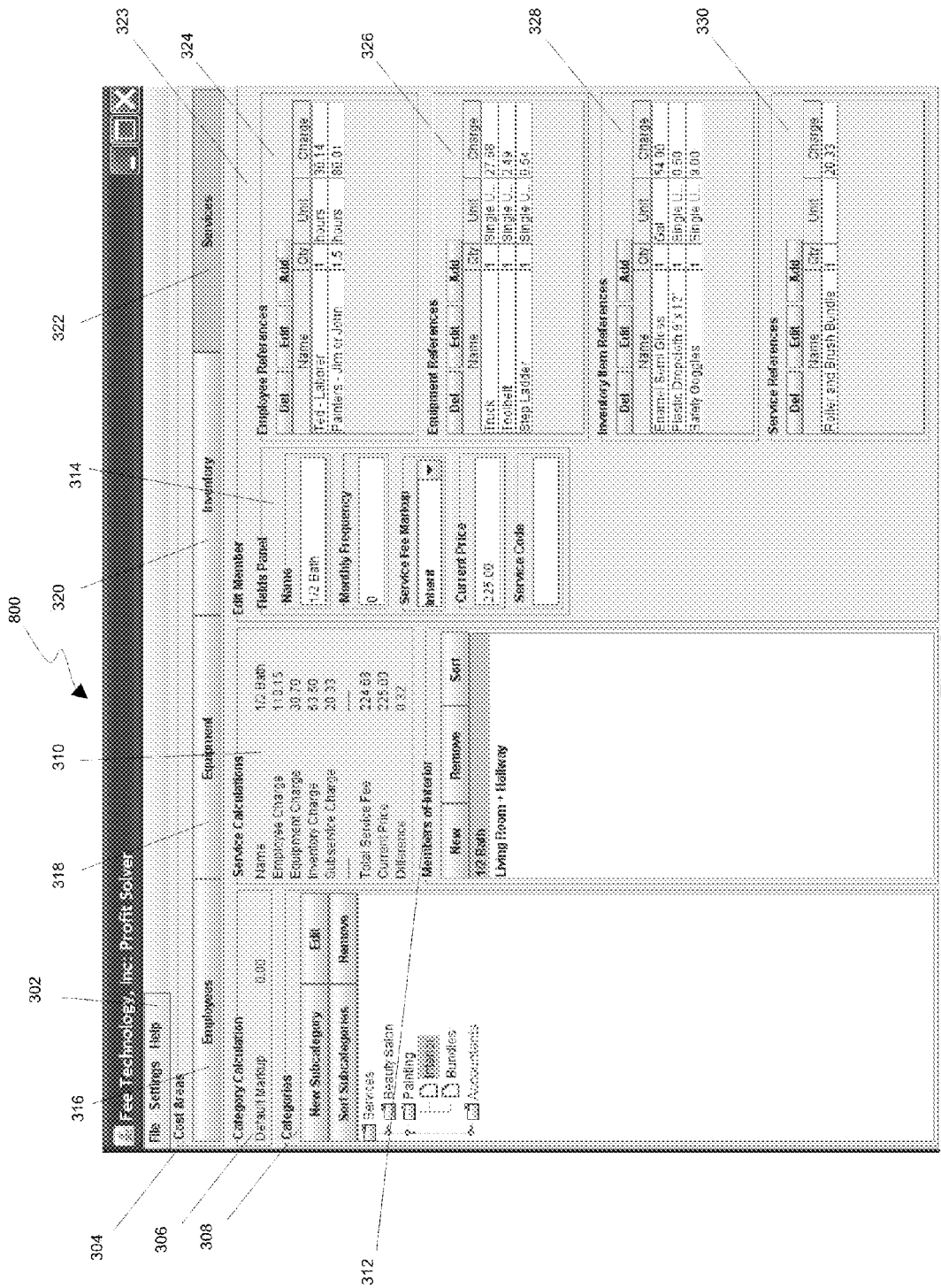
FIG. 8 illustrates an example display screen that is provided to a user in connection with adding/editing service-related information.

FIG. 8 shows display screen 800 that identifies the addition of the new listing ("Painters—Jim or John") for the service of painting a ½-bath in employee reference section 324. Moreover, employee reference section 324 in display screen 800 identifies the employee cost charged is $80.01 for the task, which represents the average of John's rate of $90.58 and Jim's rate of $69.33.

As noted above, the present invention also preferably supports selecting a plurality of categories of employees to be assigned to a service task. Continuing with the above example, it may be that one employee who is either a laborer or a painter will paint the ½-bath, or alternatively, some combination of laborers and painters will paint the ½-bath. By selecting both categories (painters and laborers), the employee costs associated with all of the laborers and painters are averaged.

Figure 9:
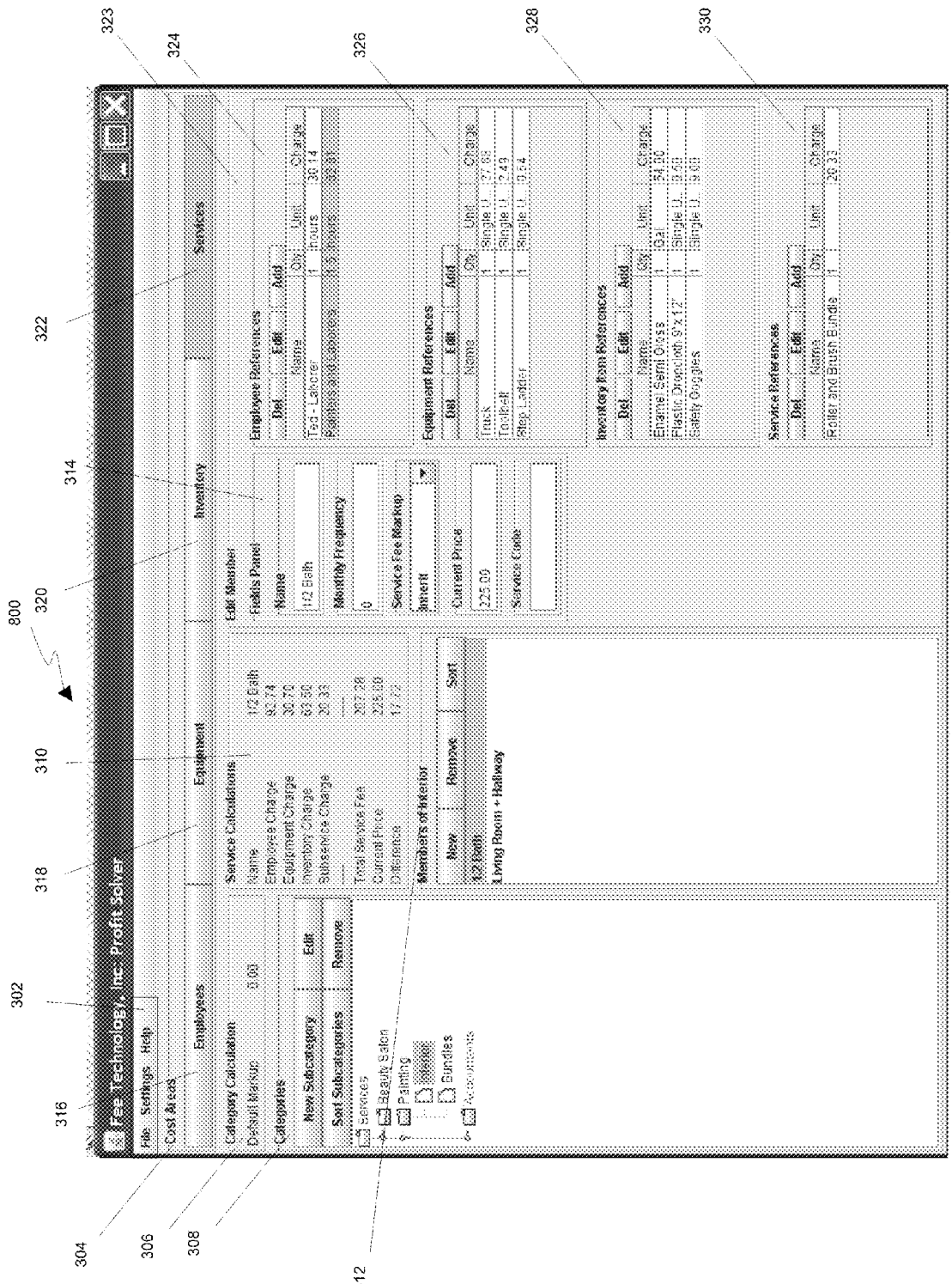
FIG. 9 is another example display screen that is provided to a user in connection with adding/editing service-related information.

FIG. 9 is another example display screen 800 that illustrates in section 324 the combined categories of painters and laborers that are selected to paint the ½-bath. In comparison with the example shown in FIG. 8, the employee charge shown in section 310 has decreased from $110.15 (FIG. 8) to $92.74 (FIG. 9).

Thus, the present invention is very flexible in that users can assign a plurality of individual employees to a respective service, or can average the costs associated with a plurality of individual employees or even categories of employees who may be assigned to perform a respective service.

The present invention also very flexible by supporting multiple practices, as illustrated in category section 308 in the example display screens. In the examples shown in category section 308, three practices are illustrated: a beauty salon practice, a painting practice and an accountants' practice. Of course, one skilled in the art will recognize that these are example practices, and that countless other service practices can be applied. For example, a single owner of a plurality of painting companies may maintain information for each of the painting companies as separate practices and determine, for example, accurate prices for each, employee efficiency and profitability in accordance with the teachings herein.

Figure 10:
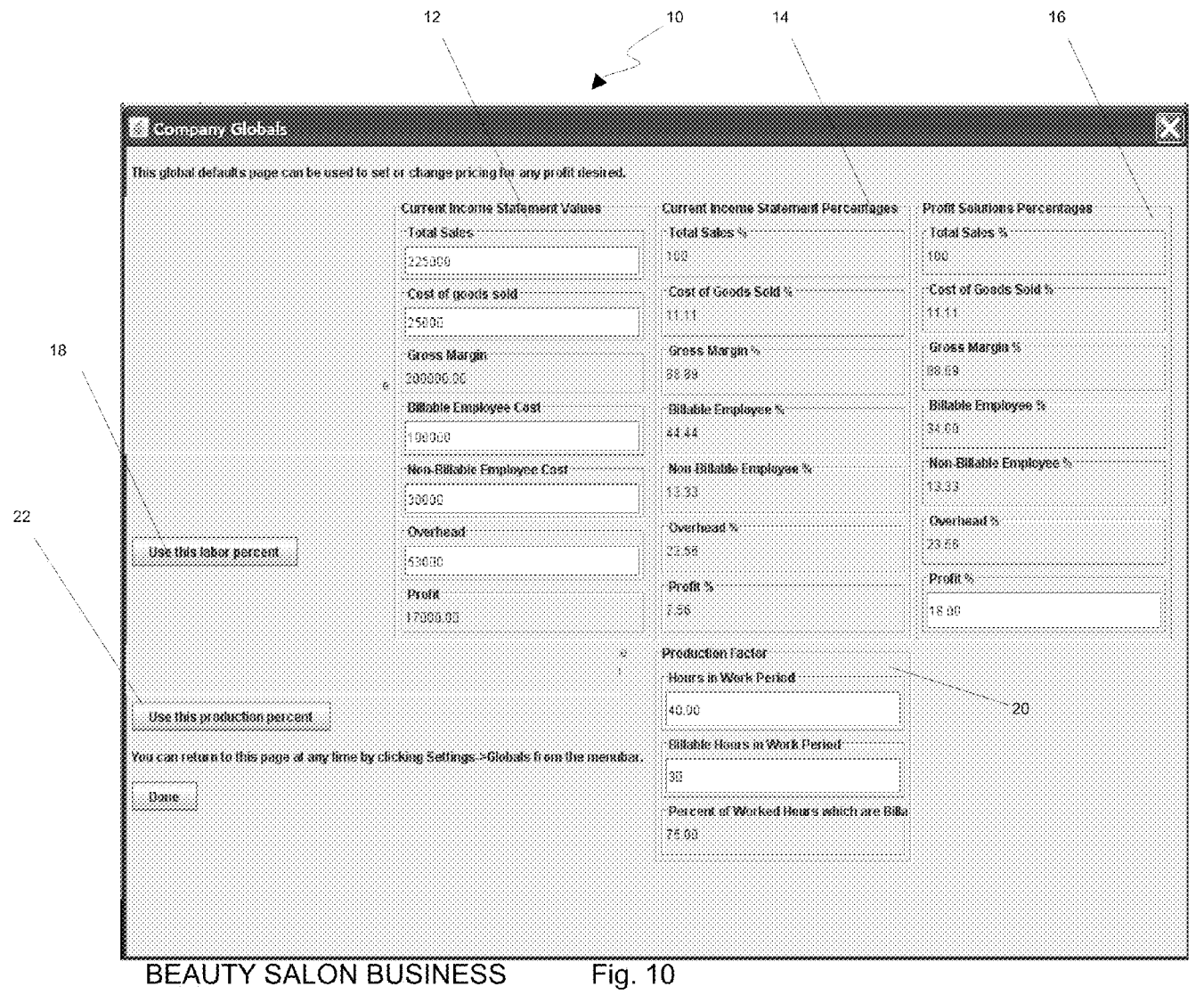

FIG. 10 illustrates an example company globals display screen 10 illustrating company global income statement values 12, global income statement percentages 14 and profit solutions percentages 16 according to a preferred embodiment of the present invention.

As shown in the FIG. 10, global information is provided for the beauty salon business. Referring now to income statement values 12, the beauty salon has a total sales figure of $225,000. Of the $225,000, $25,000 is expended on inventory, $100,000 is expended on billable employee costs, $30,000 is expended on non-billable employee costs and $53,000 is expended on overhead, thereby resulting in a profit dollar value of $17,000. The current income statement percentages found in the middle column express the current income statement in percent format. The $17,000 profit is 7.56% of sales ($225,000.00). The desired profit percent is defined by the user as 18%, and is input into the profit field located in the far right column (profit solutions percentages 16). Further, profit redefines how the billable employee percent is calculated in every labor dollar billed out. By charging out billable labor at 34 percent, then 54.89% (gross margin 88.89%–billable employee % 34%) is left to cover non-billable employee cost (13.33%), overhead (23.56%) and profit (18%).

When employees reach their productivity goals, the employee charge in each service can be broken down into the billable labor %, non billable labor %, overhead % and profit % identified in the far right column, (profit solutions percentages 16). In this way an owner will know exactly how much profit is in each charge and a breakdown of all costs that pertains to labor dollars charged. Furthermore, an owner can change the desired profit (FIG. 10) and see prices based on any profit level. By applying a 0 percent desired profit in the company global (FIG. 10, profit solutions percentages 16) and setting the mark-ups in inventory and equipment to 0, a breakeven can be seen for each service. The company global page (FIG. 10) can be used to project prices based on different profit levels, different production factors, changes in overhead expenses, and changes in non-billable employee expenses.

Thus, the present invention preferably calculates a price for each service that is fair to the customer, is fair to the staff, and fair to the owner. The price is based upon each businesses costs and generates a fair profit. In some cases however a competitive pressure to reduce the price of one or more services may be felt. Since the present invention supports a very flexible interface, discretionary reductions (or additions) in price can be attained. In instances where a current fee is higher than that suggested by the present invention, the user may wish to maintain the higher fee to offset reduced prices for other services.

Further, the present invention resolves stress that businesses face with regard to payroll. Costs associated with healthcare, worker compensation, and payroll all seem to increase beyond manageability. Another concern to many businesses is losing an employee to another business because of salary raises or benefits. The present invention enables businesses to increase health care, workers comp, raises, benefits and more by specifically identifying charges to cover such expenses to customers. A direct link is preferably established between a person performing a task and the price charged therefor.

The present invention provides an innovative and powerful software program designed to establish profitable pricing for any service business. Fees are calculated for the full range of a business' services, and each price is ensured to have built-in profit. As described above, this is accomplished by making each piece of equipment, each item of inventory, and appropriate personnel to be characterized as individual profit centers whose costs are fairly allocated to customers based upon each customer's usage. While prior art systems account for individual costs, the present invention is unique in that it allows a user to define a desired profit percentage. Using the desired profit percentage as an input parameter, the present invention calculates appropriate mark-ups for all profit centers, effectively eliminating the guesswork from pricing and creating confidence in achieving and sustaining a business' bottom line.

The present invention is designed to service a wide array of business owners or consultants. It is equally powerful when applied to a plumbing business with 50 employees or a small hairdressing shop. By entering a desired profit percent, fees are automatically calculated. Further, the user can define different profit percents in order to compare proscribed prices. The present invention is a flexible, robust and accurate model for a service owner not trained in the intricacies of accounting but wanting a reliable outcome.

Although the present invention has been described in relation to particular embodiments thereof, many other variations and modifications and other uses will become apparent to those skilled in the art. For example, the present invention can be implemented in an internet web interface. In such a context, a user can be availed of the features and options described herein using standard internet web browsing software, and establishing a communication session with information processor 102 (FIG. 1B). Much if not all of the data provided by the user can be managed in a database maintained by information processor 102. Various users can "log in" to information processor 102, for example, by supplying an authorized user name and password, and the users' respective data will be served by information processor 102, accordingly. Other features and benefits will become apparent to one skilled in the art.

It is preferred, therefore, that the present invention not be limited by the specific disclosure herein.

What is claimed:

1. A method for using a computing system to ensure a desired profit percentage in a business that provides a service for fees, the method comprising:

receiving, by at least one processor, electronic sales information, wherein the electronic sales information represents a sum of fees received for providing the service;

receiving, by the at least one processor, electronic inventory cost information, wherein the electronic inventory cost information represents at least one of a cost of a good and a cost of an outside service that may be sold in connection with providing the service;

storing, on non-transitory processor readable media, the electronic inventory cost information that is accessible to the at least one processor;

calculating, by the at least one processor, a cost of goods percentage value by executing instructions stored on the non-transitory processor readable media for dividing the electronic inventory cost information by the electronic sales information;

receiving, by the at least one processor, electronic equipment cost information, wherein the electronic equipment cost information represents a cost of equipment used for providing the service, wherein the receiving of the electronic equipment cost information occurs only in case equipment is used for providing the service;

storing, on the non-transitory processor readable media, the electronic equipment cost information wherein the storing of the electronic equipment cost information occurs only in case equipment is used for providing the service;

receiving by the at least one processor electronic billable labor cost information, wherein the electronic billable labor cost information represents at least a cost of a portion of at least one billable employee;

storing, on the non-transitory processor readable media, the electronic billable labor cost information;

calculating, by the at least one processor, a first billable labor cost percentage value by executing instructions stored on the non-transitory processor readable media for dividing the billable labor cost information by the electronic sales information;

receiving, by the at least one processor, electronic non-billable labor cost information, wherein the electronic non-billable labor cost information represents at least a portion of a cost of at least one non-billable employee;

storing, on the non-transitory processor readable media, the electronic non-billable labor cost information;

calculating, by the at least one processor, a non-billable labor cost percentage value by executing instructions stored on the non-transitory processor readable media for dividing the non-billable labor cost information by the electronic sales information;

receiving, by the at least one processor, electronic overhead cost information representing a cost of overhead;

calculating, by the at least one processor, an overhead cost percentage value by executing instructions stored on the non-transitory processor readable media for dividing the electronic overhead cost information by the electronic sales information;

receiving, by the at least one processor, an electronic profit percentage value representing a desired profit percentage to be earned as a function of billable labor;

calculating, by the at least one processor, a gross margin value by executing instructions stored on the non-transitory processor readable media for subtracting the electronic inventory cost information from the electronic sales information;

calculating, by the at least one processor, an electronic profit value by executing instructions stored on the non-transitory processor readable media for subtracting the electronic inventory cost information, the electronic billable labor cost information, the electronic non-billable labor cost information and the electronic overhead cost information from the electronic sales information;

calculating, by the at least one processor, an electronic actual profit percentage value by executing instructions stored on the non-transitory processor readable media for dividing the electronic profit value by the electronic sales information;

calculating, by the at least one processor, a gross margin percentage value by executing instructions stored on the non-transitory processor readable media for dividing the gross margin value by the electronic sales information;

calculating, by the at least one processor, an electronic profit difference percentage value by executing instructions stored on the non-transitory processor readable media for subtracting the electronic actual profit percentage value from the electronic profit percentage value;

calculating, by the at least one processor, a second billable labor cost percentage value by executing instructions stored on the non-transitory processor readable media for subtracting the electronic profit difference percentage value from the first billable labor cost percentage value;

calculating, by the at least one processor, a billable labor rate by executing instructions stored on the non-transitory processor readable media for dividing the second billable labor cost percentage value by the gross margin percentage value;

calculating, by the at least one processor, a fee for the service, wherein at least a portion of the fee is attributed to the billable labor rate and at least a portion of the fee is calculated by executing instructions stored on the non-transitory processor readable media as a function at least one of the electronic inventory information and the electronic equipment information, and further wherein profit realized by the fee for the service equals the electronic profit percentage value; and outputting, by the at least one processor, the fee to at least one of a display device and a printing device.

2. The method of claim 1, wherein the portion of the fee that is attributed to the billable labor rate covers a percentage of a cost of the least one billable employee, a percentage of the cost of the least one non-billable employee, a percentage of the cost of overhead and the electronic profit percentage.

3. The method of claim 1, further comprising calculating, by the at least one processor, a second billable labor rate that is calculated as:

$$\frac{\text{billable labor cost per billable minute} * \text{productivity factor}}{\text{billable labor rate}}.$$

4. The method of claim 3, wherein the billable labor cost per billable minute is calculated by the at least one processor as:

$$\frac{(\text{billable labor cost})}{(\text{billable weeks per year} * \text{hours per work week} * \text{minutes per work hour})}.$$

5. The method of claim 4, wherein the billable labor cost is calculated by the at least one processor as:

wages+benefits+employer taxes.

6. The method of claim 5, wherein the wages include amount wages paid to billable labor, benefits paid to billable labor and employer taxes paid for billable labor.

7. The method of claim 4, wherein the billable weeks per year is calculated by the at least one processor as:

total paid work weeks−paid time off in weeks.

8. The method of claim 3, wherein the productivity factor is calculated by the at least one processor as:

$$\frac{(\text{hours per work period})}{(\text{billable hours per work period})}.$$

9. The method of claim 1, further comprising calculating by the at least one processor the second billable labor percentage value as:

gross margin percent−non-billable labor percent−overhead percent−electronic profit percent.

10. The method of claim 1, further comprising overriding the billable labor rate value for a respective category of labor.

11. The method of claim 1, further comprising overriding the billable labor rate value for a respective person providing labor.

12. The method of claim 1, wherein a second portion of the fee includes a charge for equipment used while providing the service.

13. The method of claim 12, wherein the charge for equipment is calculated by the at least one processor as:

replacement cost per use+return on investment charge per use+maintenance and supply cost per use+ maintenance and supply mark-up percent.

14. The method of claim 13 wherein the replacement cost per use is calculated by the at least one processor as:

$$\frac{\left[\frac{(\text{equipment cost})}{(\text{equipment life span})}\right]}{(\text{number of uses per year})}.$$

15. The method of claim 13 wherein the return on investment charge per use is calculated by the at least one processor as:

$$\frac{(\text{equipment cost} * \text{return on investment percent})}{(\text{life span}) * (\text{number of uses per year})}.$$

16. The method of claim 13 wherein the maintenance and supply cost per use is calculated by the at least one processor as:

$$\frac{(\text{maintenance and supply costs})}{(\text{number of uses per year})}.$$

17. The method of claim 13 wherein the maintenance and supply mark-up percent is calculated by the at least one processor as:

$$\frac{(\text{maintenance and supply costs} * \text{mark-up percent})}{(\text{number of uses per year})}.$$

18. The method of claim 1, wherein a second portion of the fee includes associated inventory charge per use or outside service charge while providing the service.

19. The method of claim 18, wherein the inventory charge per use is calculated by the at least one processor as:

cost of inventory per use+inventory mark-up per use.

20. The method of claim 19 wherein the cost of inventory per use is calculated by the at least one processor as:

$$\frac{\text{cost of inventory}}{\text{number of units of inventory}}.$$

21. The method of claim 19 wherein the inventory mark-up per use is calculated by the at least one processor as:

$$\frac{(\text{cost of inventory} * \text{mark-up percent})}{(\text{number of units of inventory})}.$$

22. The method of claim 18, wherein the outside service charge is calculated by the at least one processor as:

(cost of outside service+outside service mark-up charge).

23. The method of claim 22 wherein the outside service mark-up charge is calculated by the at least one processor as:

cost of outside service*mark-up percent.

24. A system for ensuring a desired profit percentage in a business that provides a service for fees, the system comprising:
    a computing device comprising:
        at least one processor;
        non-transitory processor readable media operatively coupled to the at least one processor; and
        at least one of a display device and a printing device, wherein the processor is programmed and configured;
    to electronically receive electronic sales information representing a sum of fees received for providing the service;
    to electronically receive electronic inventory cost information and to store the electronic inventory cost information on the non-transitory processor readable media, wherein the electronic inventory cost information represents at least one of a cost of a good and a cost of an outside service that may be sold in connection with providing the service, and further to calculate a cost of goods percentage value by dividing the electronic inventory cost information by the electronic sales information;
    to electronically receive electronic equipment cost information and store the electronic equipment cost information on the non-transitory processor readable media, wherein the electronic equipment cost information represents a cost of equipment used for providing the service, and further to receive the electronic equipment cost information only in case equipment is used for providing the service;
    to receive electronic billable labor cost information and to store the electronic billable labor cost information on the non-transitory processor readable media, wherein the electronic billable labor cost information represents at least a cost of a portion of at least one billable employee, and further to calculate a first billable labor cost percentage value by dividing the billable labor cost information by the electronic sales information;
    to receive electronic non-billable labor cost information representing at least a portion of a cost of at least one non-billable employee, and further to calculate a non-billable labor cost percentage value by dividing the non-billable labor cost information by the electronic sales information;
    to receive electronic overhead cost information representing a cost of overhead and further to calculate an overhead cost percentage value by dividing the electronic overhead cost information by the electronic sales information;
    to receive an electronic profit percentage value representing a desired profit percentage to be earned as a function of billable labor;
    to calculate a gross margin value by subtracting the electronic inventory cost information from the electronic sales information;
    to calculate an electronic actual profit value by subtracting the electronic inventory cost information, the electronic billable labor cost information, the electronic non-billable labor cost information and the electronic overhead cost information from the electronic sales information;
    to calculate an electronic profit difference percentage value by subtracting the electronic actual profit value from the electronic percentage value;
    to calculate a gross margin percentage value by dividing the gross margin value by the electronic sales information;
    to calculate a second billable labor cost percentage value by subtracting the electronic profit difference percentage value from the first billable labor cost percentage value;
    to calculate a billable labor rate by dividing the second billable labor cost percentage value by the gross margin percentage value;
    to calculate a fee for the service, wherein at least a first portion of the fee is attributed to the billable labor rate and at least a second portion of the fee is calculated as a function at least one of the electronic inventory information and the electronic equipment information, and further wherein profit realized by the fee for the service equals the electronic profit percentage value; and
    to output the fee to the at least one of the display device and the printing device.

25. The system of claim 24, wherein the first portion of the fee attributed to the billable labor rate covers a percentage of a cost of the least one billable employee, a percentage of the cost of the least one non-billable employee, a percentage of the cost of overhead and the electronic profit percentage.

26. The system of claim 24, wherein the at least one processor is further programmed and configured to calculate a second billable labor rate that is calculated as:

$$\frac{\text{billable labor cost per billable minute} * \text{productivity factor}}{\text{billable labor rate}}.$$

27. The system of claim 26, wherein the billable labor cost per billable minute is calculated by the at least one processor as:

$$\frac{(\text{billable labor cost})}{(\text{billable weeks per year} * \text{hours per work week} * \text{minutes per work hour})}.$$

28. The system of claim 27, wherein the billable labor cost is calculated by the at least one processor as:

wages+benefits+employer taxes.

29. The system of claim 28, wherein the wages include amount wages paid to billable labor, benefits paid to billable labor and taxes paid for billable labor.

30. The system of claim 27, wherein the billable weeks per year is calculated by the at least one processor as:

total paid work weeks−paid time off in weeks.

31. The system of claim 26, wherein the productivity factor is calculated by the at least one processor as:

$$\frac{(\text{hours per work period})}{(\text{billable hours per work period})}.$$

32. The system of claim 26, wherein the at least one processor is further programmed and configured to calculate the second billable labor percentage value as:

gross margin percent−non-billable labor percent−overhead percent−electronic profit percent.

33. The system of claim 24, wherein the at least one processor is further programmed and configured to override the billable labor rate value for a respective category of labor.

34. The system of claim 33, wherein the at least one processor is further programmed and configured to override the billable labor rate value for a respective person providing labor.

35. The system of claim 24, wherein the the second portion of the fee further includes a charge for equipment used while providing the service.

36. The system of claim 35, wherein the charge for equipment is calculated by the at least one processor as:

replacement cost per use+return on investment charge per use+maintenance and supply cost per use+maintenance and supply mark-up percent.

37. The system of claim 36 wherein the replacement cost per use is calculated by the at least one processor as:

$$\frac{\left[\frac{(\text{equipment cost})}{(\text{equipment life span})}\right]}{(\text{number of uses per year})}.$$

38. The system of claim 36 wherein the return on investment charge per use is calculated by the at least one processor as:

$$\frac{(\text{equipment cost} * \text{return on investment percent})}{(\text{life span}) * (\text{number of uses per year})}.$$

39. The system of claim 36 wherein the maintenance and supply cost per use is calculated by the at least one processor as:

$$\frac{(\text{maintenance and supply costs})}{(\text{number of uses per year})}.$$

40. The system of claim 36 wherein the maintenance and supply mark-up percent is calculated by the at least one processor as:

$$\frac{(\text{maintenance and supply costs} * \text{mark-up percent})}{(\text{number of uses per year})}.$$

41. The system of claim 24, wherein the second portion of the fee includes an associated inventory charge per use or an outside service charge while providing the service.

42. The system of claim 41, wherein the inventory charge per use is calculated by the at least one processor as:

(cost of inventory per use+inventory mark-up per use).

43. The system of claim 42, wherein the cost of inventory per use is calculated by the at least one processor as:

$$\frac{\text{cost of inventory}}{\text{number of units of inventory}}.$$

44. The system of claim 42, wherein the inventory mark-up per use is calculated by the at least one processor as:

$$\frac{(\text{cost of inventory} * \text{mark-up percent})}{(\text{number of units of inventory})}.$$

45. The system of claim 41, wherein the outside service charge is calculated by the at least one processor as:

(cost of outside service+outside service mark-up charge).

46. The system of claim 45, wherein the outside service mark-up charge is calculated by the at least one processor as:

(cost of outside service*mark-up percent).

* * * * *